(12) United States Patent
Masuda

(10) Patent No.: US 10,539,752 B2
(45) Date of Patent: Jan. 21, 2020

(54) OPTICAL STRUCTURE

(71) Applicant: INTERNATIONAL BUSINESS MACHINES CORPORATION, Armonk, NY (US)

(72) Inventor: Koji Masuda, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/981,306

(22) Filed: May 16, 2018

(65) Prior Publication Data
US 2018/0267264 A1 Sep. 20, 2018

Related U.S. Application Data

(63) Continuation of application No. 15/407,646, filed on Jan. 17, 2017, now Pat. No. 10,025,044.

(51) Int. Cl.
*G02B 6/12* (2006.01)
*G02B 6/42* (2006.01)

(52) U.S. Cl.
CPC ....... *G02B 6/4239* (2013.01); *G02B 6/12004* (2013.01); *G02B 6/4214* (2013.01); *G02B 6/4245* (2013.01); *G02B 2006/12102* (2013.01); *G02B 2006/12121* (2013.01)

(58) Field of Classification Search
CPC .. G02B 6/4239; G02B 6/4245; G02B 6/4214; G02B 6/12004; G02B 2006/12102; G02B 2006/12121
See application file for complete search history.

(56) References Cited

U.S. PATENT DOCUMENTS

| 4,744,623 | A  | * | 5/1988 | Prucnal | G02B 6/3803 |
| | | | | | 219/121.69 |
| 9,116,292 | B2 | * | 8/2015 | Fujiwara | G02B 6/12004 |
| 9,616,459 | B1 | * | 4/2017 | Lohmeier | G01S 17/00 |
| 2001/0031117 | A1 | * | 10/2001 | Steinberg | G02B 6/423 |
| | | | | | 385/88 |
| 2004/0067025 | A1 | * | 4/2004 | Haraguchi | G02B 6/3636 |
| | | | | | 385/49 |
| 2007/0099346 | A1 | | 5/2007 | Farooq et al. | |

(Continued)

OTHER PUBLICATIONS

List of IBM Patents or Patent Applications Treated as Related dated May 16, 2018, 2 pages.

(Continued)

*Primary Examiner* — Ellen E Kim
(74) *Attorney, Agent, or Firm* — Tutunjian & Bitetto, P.C.; Vazken Alexanian

(57) ABSTRACT

An optical structure is presented. The optical structure includes a substrate including a cavity on a first surface of the substrate. The optical structure further includes an optical component on the substrate, the optical component including a second surface opposed to the first surface of the substrate. The optical structure also includes an adhesive in a gap between the first surface of the substrate and the second surface of the optical component affixing the optical component to the substrate, wherein at least one of the first surface of the substrate and the second surface of the optical component includes a predetermined portion arranged around the cavity, wherein the predetermined portion prevents the adhesive from infiltrating.

13 Claims, 26 Drawing Sheets

(56) References Cited

U.S. PATENT DOCUMENTS

| | | | |
|---|---|---|---|
| 2008/0123198 A1* | 5/2008 | Fujita | G02B 6/4206 359/709 |
| 2008/0237810 A1 | 10/2008 | Subramanian et al. | |
| 2009/0180732 A1* | 7/2009 | Takai | G02B 6/42 385/14 |
| 2009/0297096 A1* | 12/2009 | Hodono | G02B 6/4214 385/14 |
| 2010/0020301 A1* | 1/2010 | Sugiyama | B41J 2/45 355/67 |
| 2011/0052118 A1* | 3/2011 | Matsuoka | G02B 6/12002 385/14 |
| 2011/0080657 A1* | 4/2011 | Takai | G02B 6/4206 359/742 |
| 2013/0259421 A1* | 10/2013 | Yamakami | B29D 11/00721 385/14 |
| 2013/0259430 A1* | 10/2013 | Tanaka | G02B 6/4206 385/88 |
| 2014/0241733 A1* | 8/2014 | Moriyama | G02B 6/4206 398/138 |
| 2014/0264400 A1 | 9/2014 | Lipson et al. | |
| 2014/0361153 A1* | 12/2014 | Motohara | G02B 6/4253 250/227.11 |
| 2015/0277066 A1 | 10/2015 | Nakagawa et al. | |
| 2015/0355409 A1* | 12/2015 | Yanagisawa | G02B 6/322 385/14 |
| 2015/0378095 A1* | 12/2015 | Hsu | G02B 6/4214 385/14 |
| 2017/0148646 A1* | 5/2017 | Horibe | G02B 6/12004 |

OTHER PUBLICATIONS

Linford, M.R., "Hydrophobic Coatings on Polymer Surfaces" IdeaConnection (2007) pp. 1-4.

Tokunari, M. et al., "Assembly optimization for low power optical MCM link" IEEE CPMT Symposium Japan (Nov. 2015) pp. 166-169.

* cited by examiner

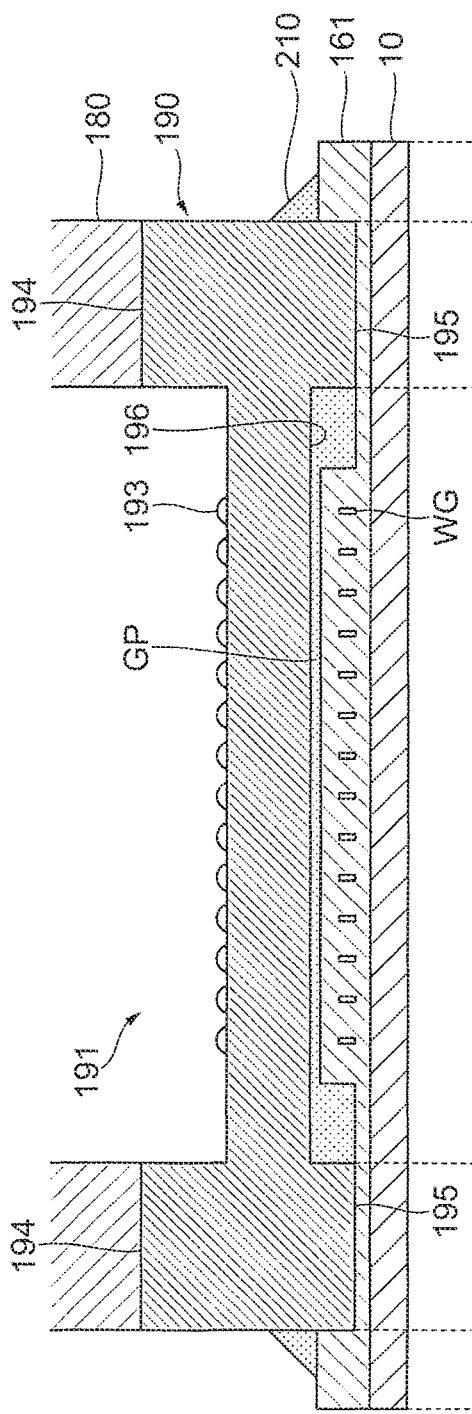
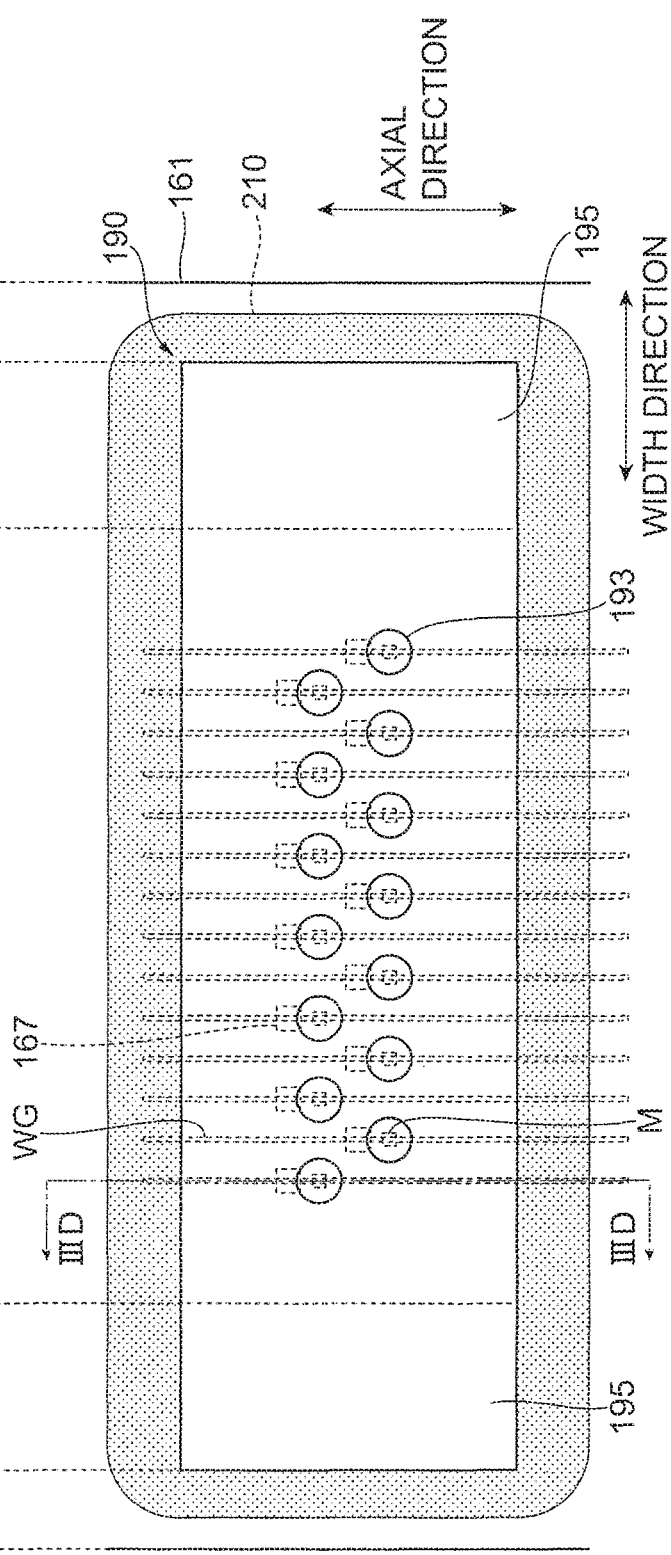

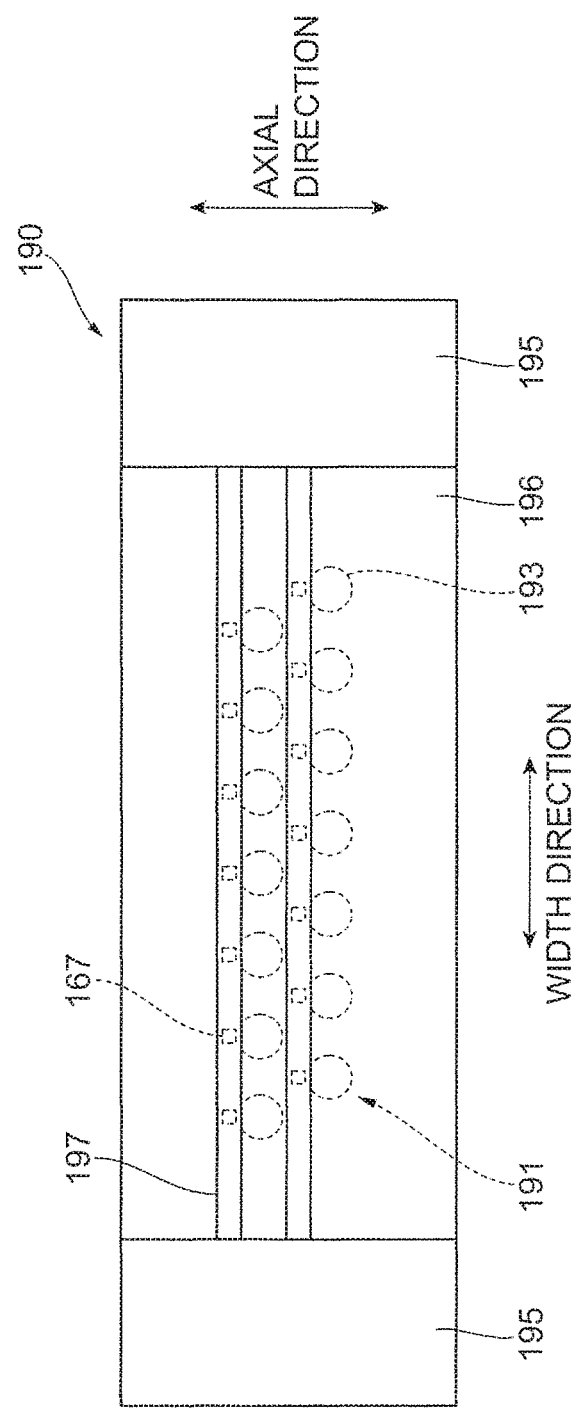

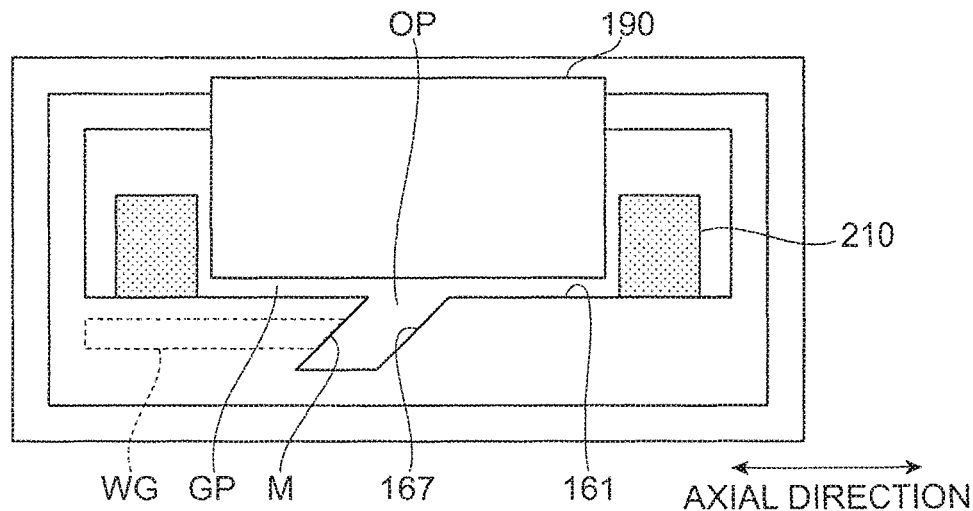
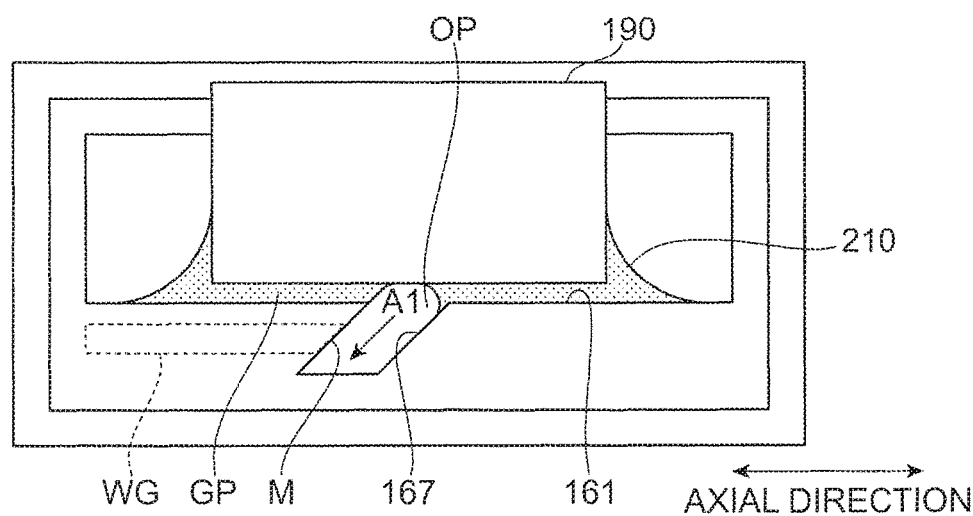
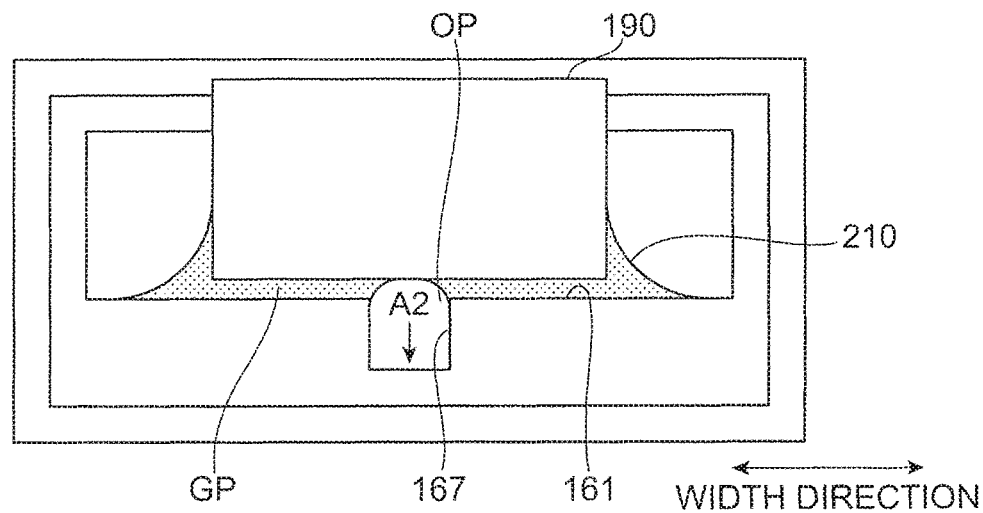

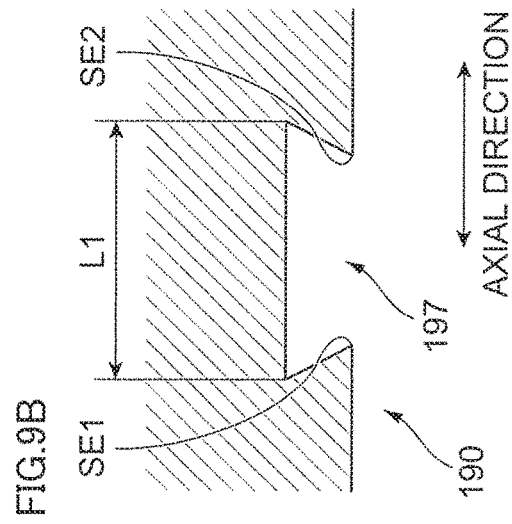
FIG.9A
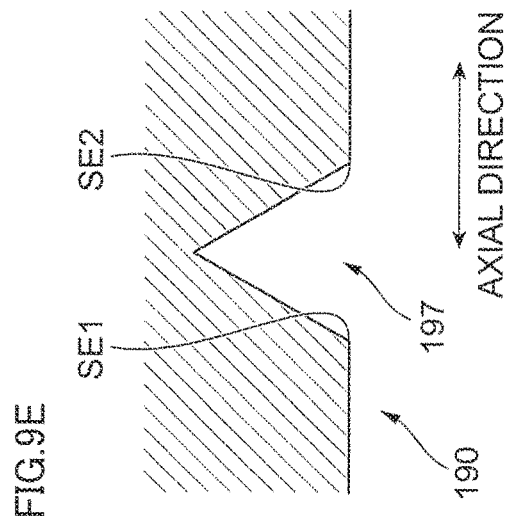
FIG.9B
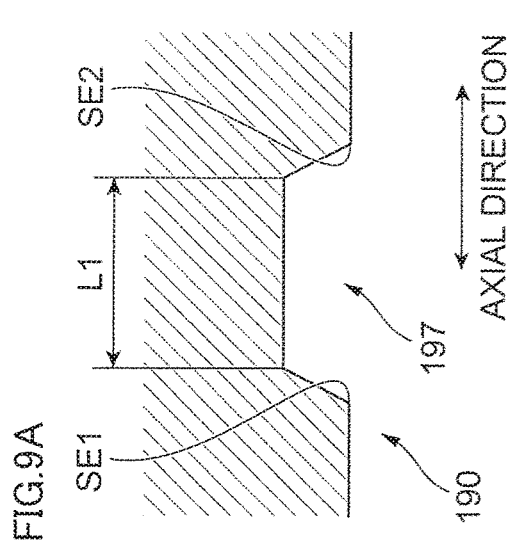
FIG.9C
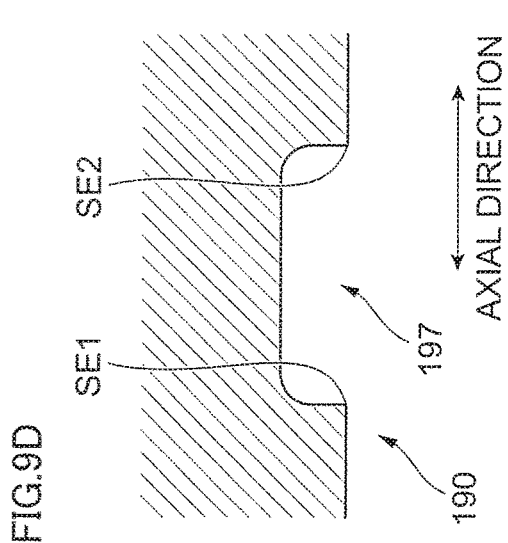
FIG.9D
FIG.9E
FIG.9F

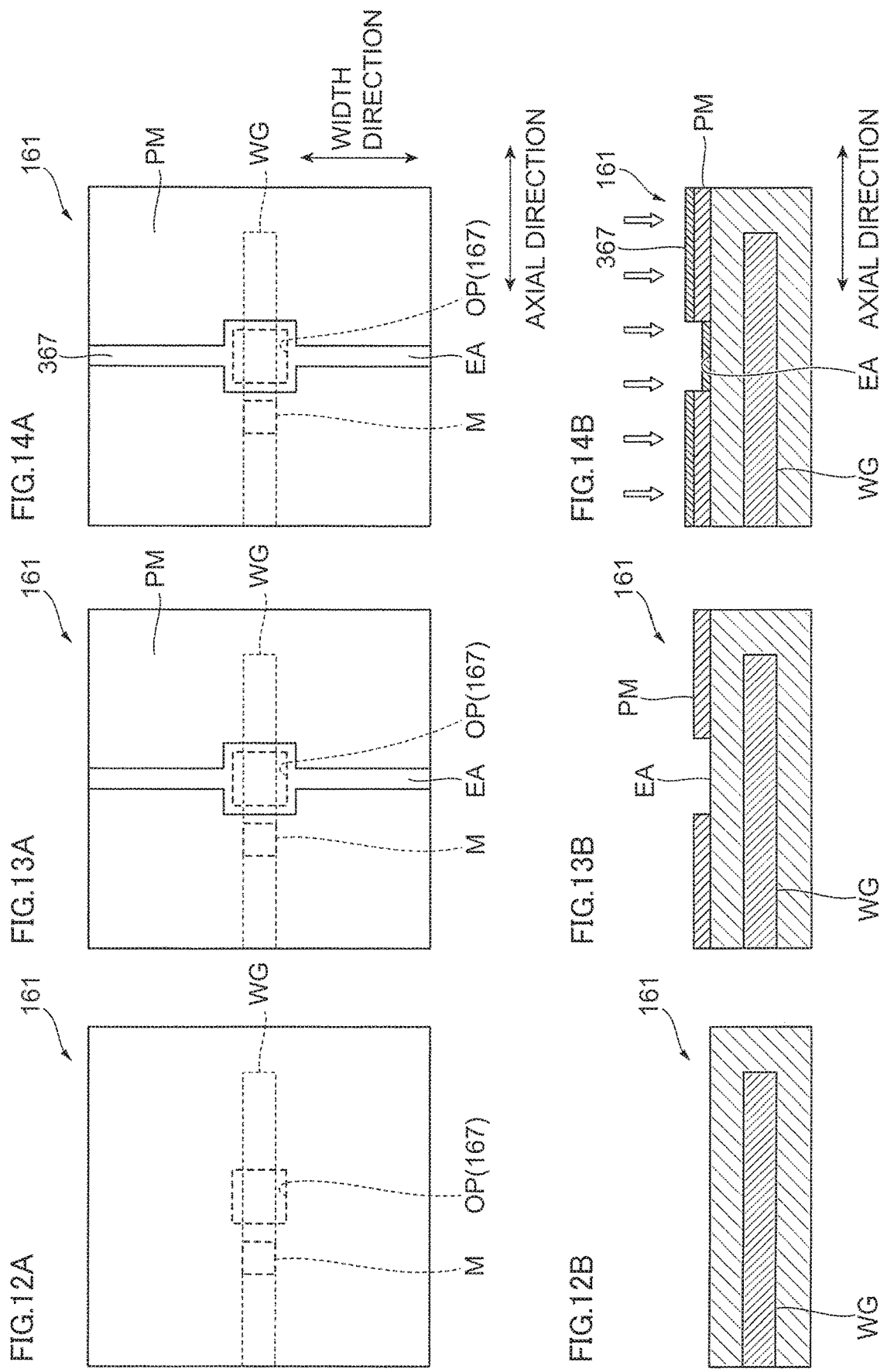

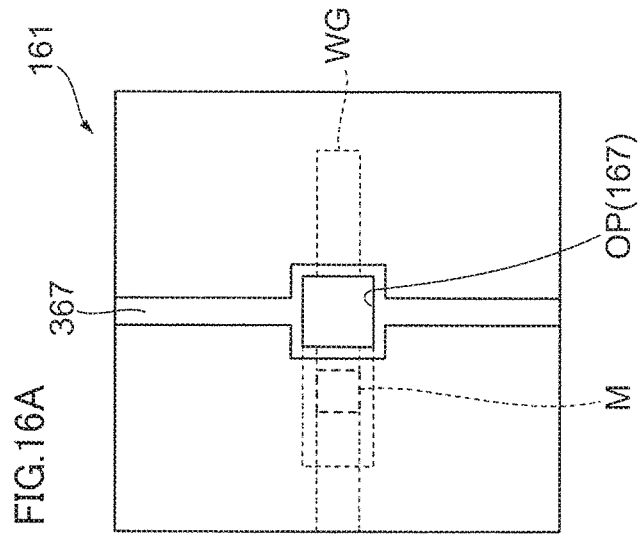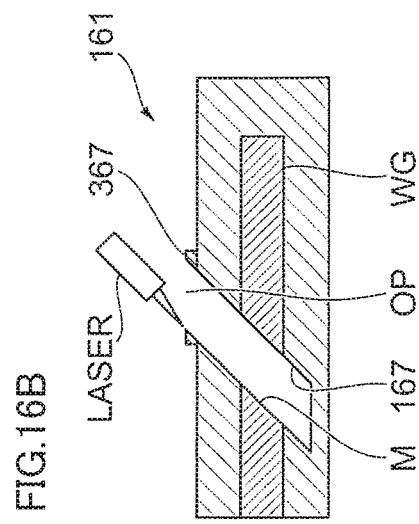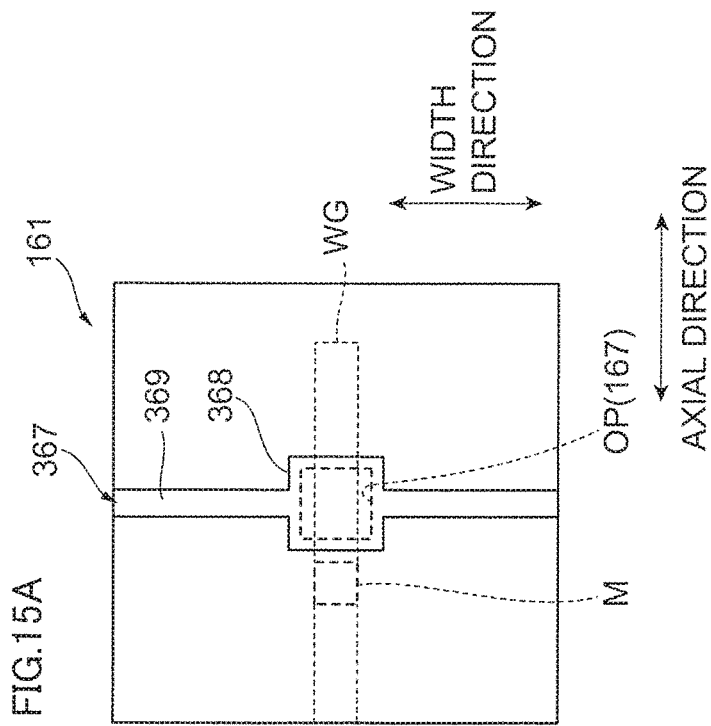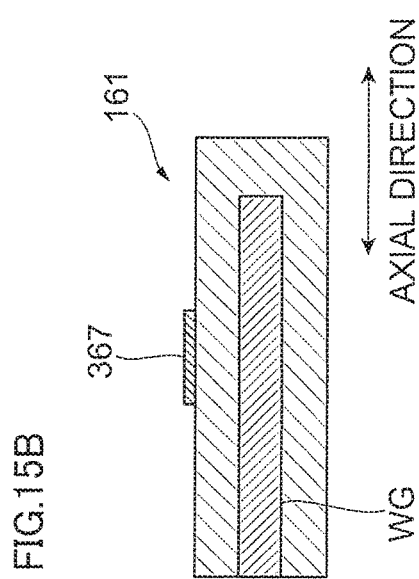

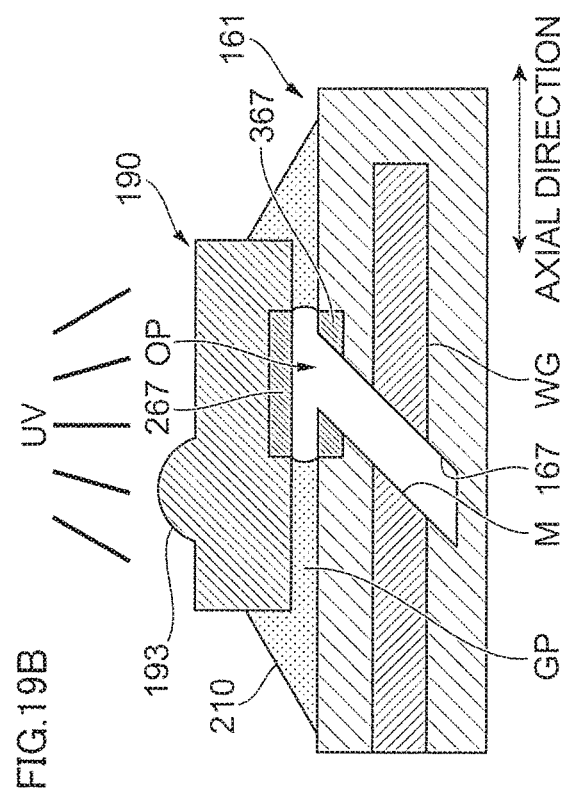
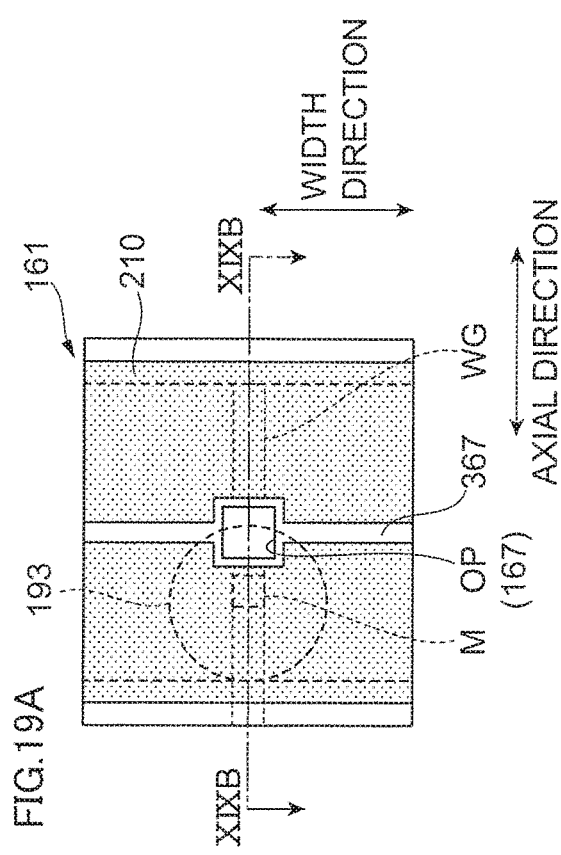
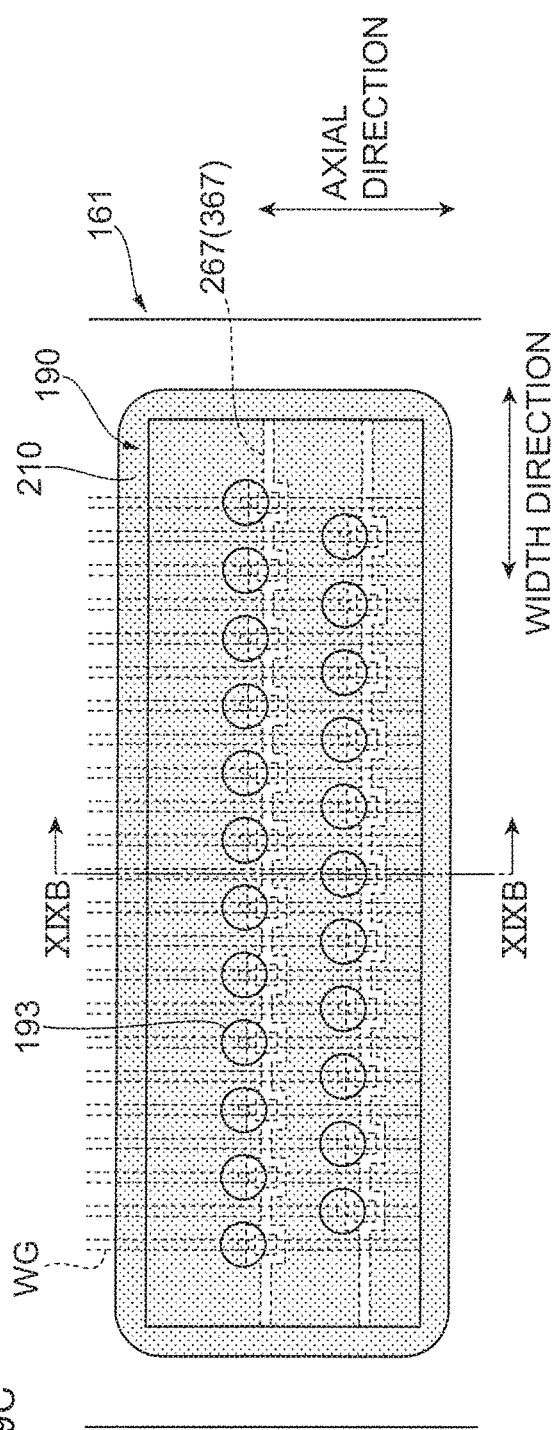

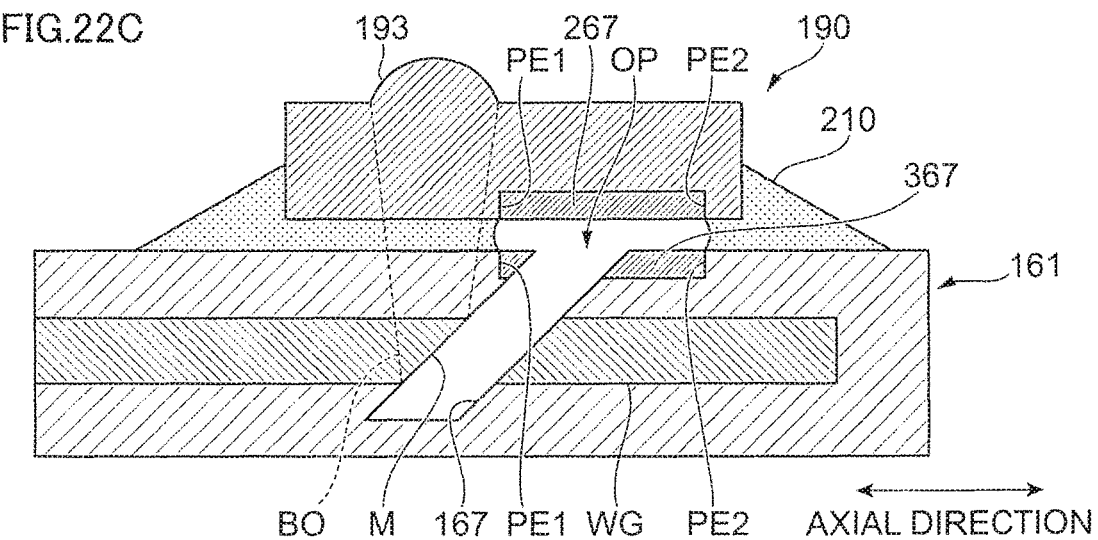
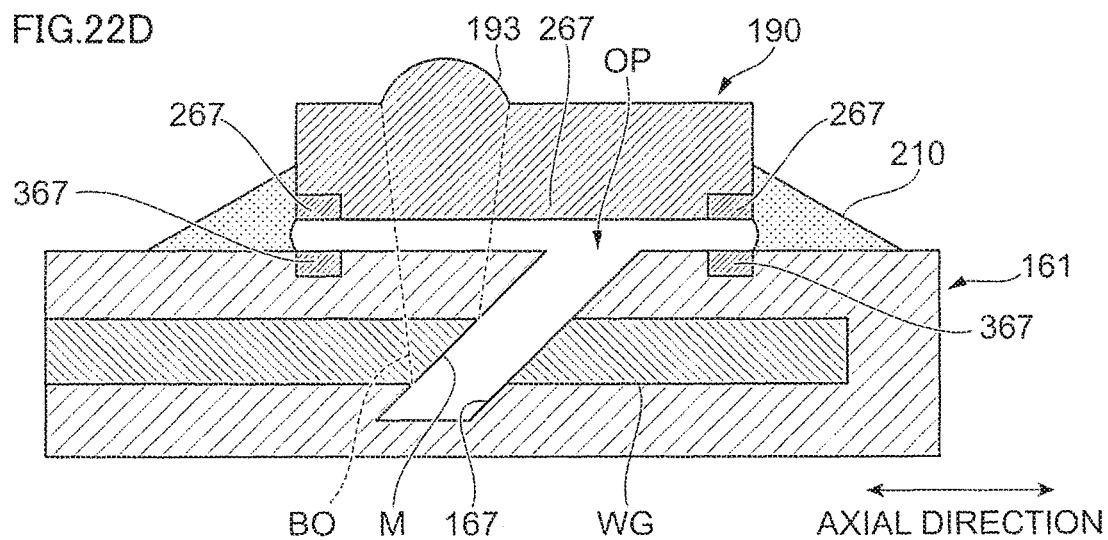
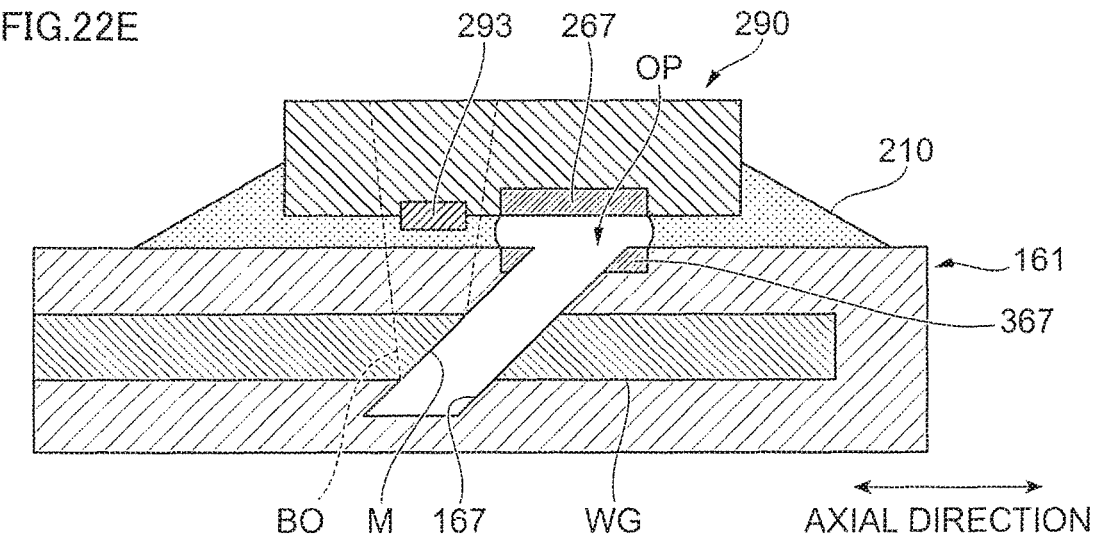

US 10,539,752 B2

OPTICAL STRUCTURE

BACKGROUND

Technical Field

The present invention generally relates to optical transmission, and more particularly to an optical structure.

Description of the Related Art

Currently, new optical structures are needed.

SUMMARY

According to an embodiment of the present invention, an optical structure is provided. The optical structure includes a substrate including a cavity on a first surface of the substrate. The optical structure further includes an optical component on the substrate, the optical component including a second surface opposed to the first surface of the substrate. The optical structure also includes an adhesive in a gap between the first surface of the substrate and the second surface of the optical component affixing the optical component to the substrate, wherein at least one of the first surface of the substrate and the second surface of the optical component includes a predetermined portion arranged around the cavity, wherein the predetermined portion prevents the adhesive from infiltrating.

According to another embodiment of the present invention, an optical multi-chip module is provided. The multi-chip module includes a substrate including a waveguide core and a cavity, the waveguide core allowing a light to pass therethrough, the cavity being located on a first surface of the substrate to intersect the waveguide core, the cavity being filled with a gas. The multi-chip module further includes an optical component on the substrate, the optical component including a second surface opposed to the first surface of the substrate. The multi-chip module also includes an adhesive in a gap between the substrate and the optical component due to capillary effect affixing the optical component to the substrate, wherein an interface between the waveguide core and the cavity reflects the light by total internal reflection, and at least one of the first surface of the substrate and the second surface of the optical component includes a predetermined portion around the cavity.

According to yet another embodiment of the present invention, a method for fabricating an optical structure is provided. The method includes forming a substrate with a cavity on a first surface of the substrate. The method further includes forming an optical component with a second surface. The method also includes providing a predetermined portion on at least one of the first surface of the substrate and the second surface of the optical component. The method further includes mounting the optical component on the substrate and the second surface of the optical component being opposed to the first surface of the substrate. The method also includes applying an adhesive between the substrate and the optical component so that the adhesive infiltrates into a gap between the substrate and the optical component. The method further includes preventing the adhesive from flowing into the cavity with the predetermined portion. The method also includes affixing the optical component to the substrate with the adhesive.

BRIEF DESCRIPTION OF THE DRAWINGS

FIG. 3A depicts a schematic cross-sectional view taken along the line IIIA-IIIA in FIG. 2;

FIG. 3B depicts a top view of the substrate side component according to embodiments of the present invention;

FIG. 5A depicts a bottom view of the substrate side component according to embodiments of the present invention;

FIG. 7A depicts a configuration for simulation of fluid dynamics of the adhesive;

FIG. 7B depicts a simulation result of the flow of the adhesive in a direction parallel to the waveguide cores without the grooves according to a comparative example;

FIG. 7C depicts a simulation result of the flow of the adhesive in a direction perpendicular to the waveguide cores without the grooves according to the comparative example;

FIGS. 9A, 9B, 9C, 9D, 9E and 9F depict a cross-sectional view of the groove according to some embodiments of the present invention;

FIGS. 12A and 12B depict a top view and a side view, respectively, of the waveguide layer at the first step of the fabrication process according to some embodiments of the present invention.

FIGS. 13A and 13B depict a top view and a side view, respectively, of the waveguide layer at the second step of the fabrication process;

FIGS. 14A and 14B depict a top view and a side view, respectively, of the waveguide layer at the third step of the fabrication process;

FIGS. 15A and 15B depict a top view and a side view, respectively, of the waveguide layer at the fourth step of the fabrication process;

FIGS. 16A and 16B depict a top view and a side view, respectively, of the waveguide layer at the fifth step of the fabrication process;

FIGS. 19A, 19B and 19C depict a top view, a side view, and a wide range top view, respectively, of the waveguide layer at the eighth step of the fabrication process;

FIGS. 22A, 22B, 22C, 22D and 22E depict a side view of the mirror cavities according to the third, the forth, the fifth, the sixth and the seventh modification of the second embodiment, respectively.

DETAILED DESCRIPTION

Hereinafter, exemplary embodiments of the present invention will be described in detail with reference to the attached drawings.

It is to be noted that the present invention is not limited to these exemplary embodiments to be given below and can be implemented with various modifications within the scope of the present invention. In addition, the drawings used herein are for purposes of illustration, and may not show actual dimensions.

Figure 1:
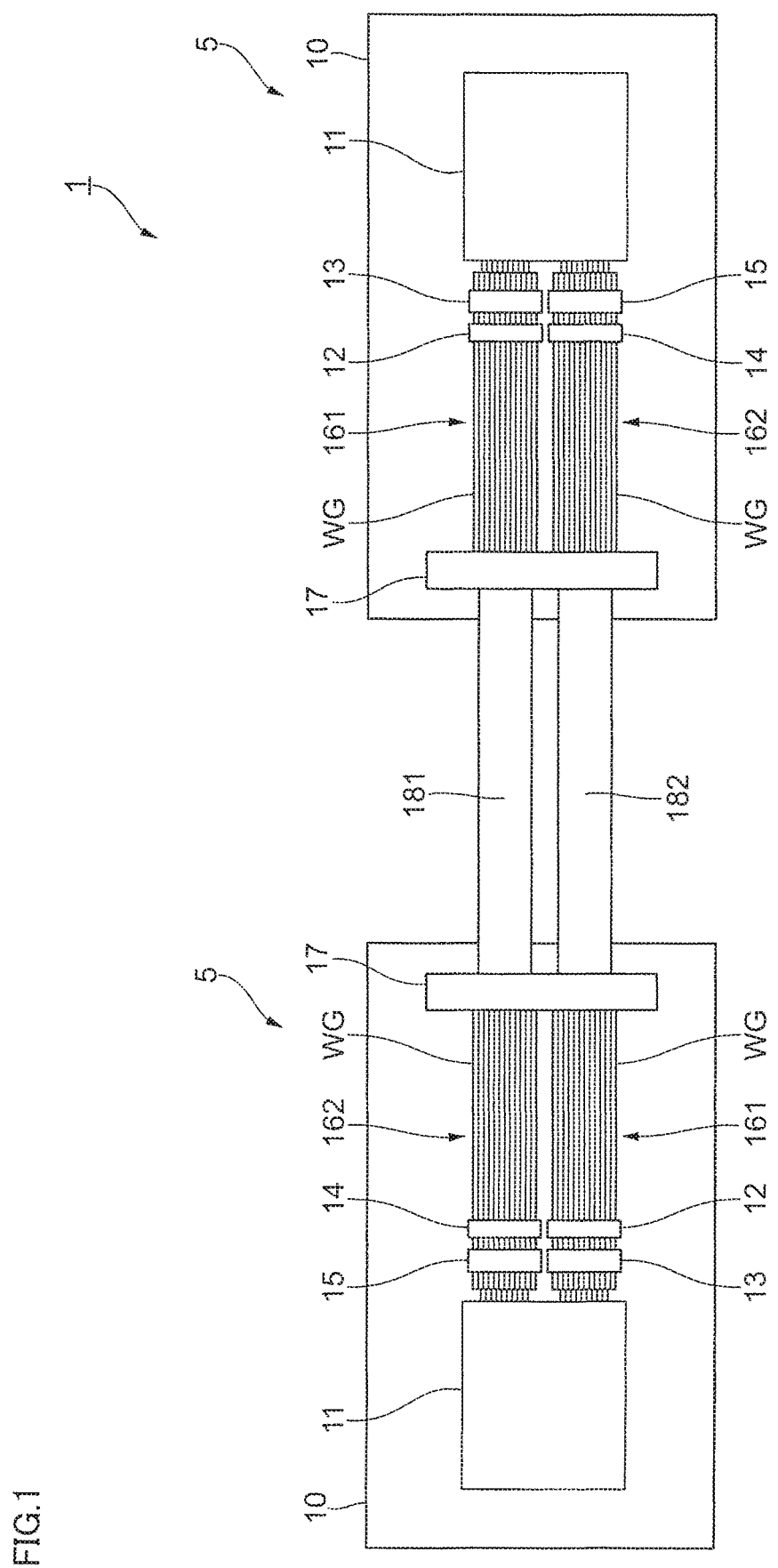
FIG. 1 depicts a top view of an optical communication system according to embodiments of the present invention.

Referring to FIG. 1, there is shown a top view of an optical communication system 1 according to some embodiments of the present invention. As shown in the figure, the optical communication system 1 can include two multi-chip modules (MCMs) 5. A multi-chip module (MCM) 5 can include a main substrate 10, a central processing unit (CPU) 11, a vertical cavity surface emitting laser (VCSEL) chip array 12, a laser diode driver (LDD) chip 13, a photodiode (PD) chip array 14, a trans-impedance amplifiers (TIA) chip 15, waveguide layers 161 and 162, and a fiber connector 17. Further, as shown in the figure, the optical communication system 1 can include fiber cables 181 and 182 each having several (e.g., 12 or 24) fiber cable cores.

The waveguide layer 161 can include multiple waveguide cores WG whose number matches the number of cores of the fiber cable 181 or 182. The VCSEL chip array 12 can include multiple VCSEL devices whose number matches the number of fiber cores (not shown) of the waveguide layer 161. The waveguide layer 162 can include multiple waveguide cores WG whose number matches the number of fiber cores (not shown) of the fiber cable 181 or 182. The PD chip array 14 can include multiple PD devices whose number matches the number of cores of the waveguide layer 162. The MCM 5 is an example of an optical multi-chip module.

Figure 2:
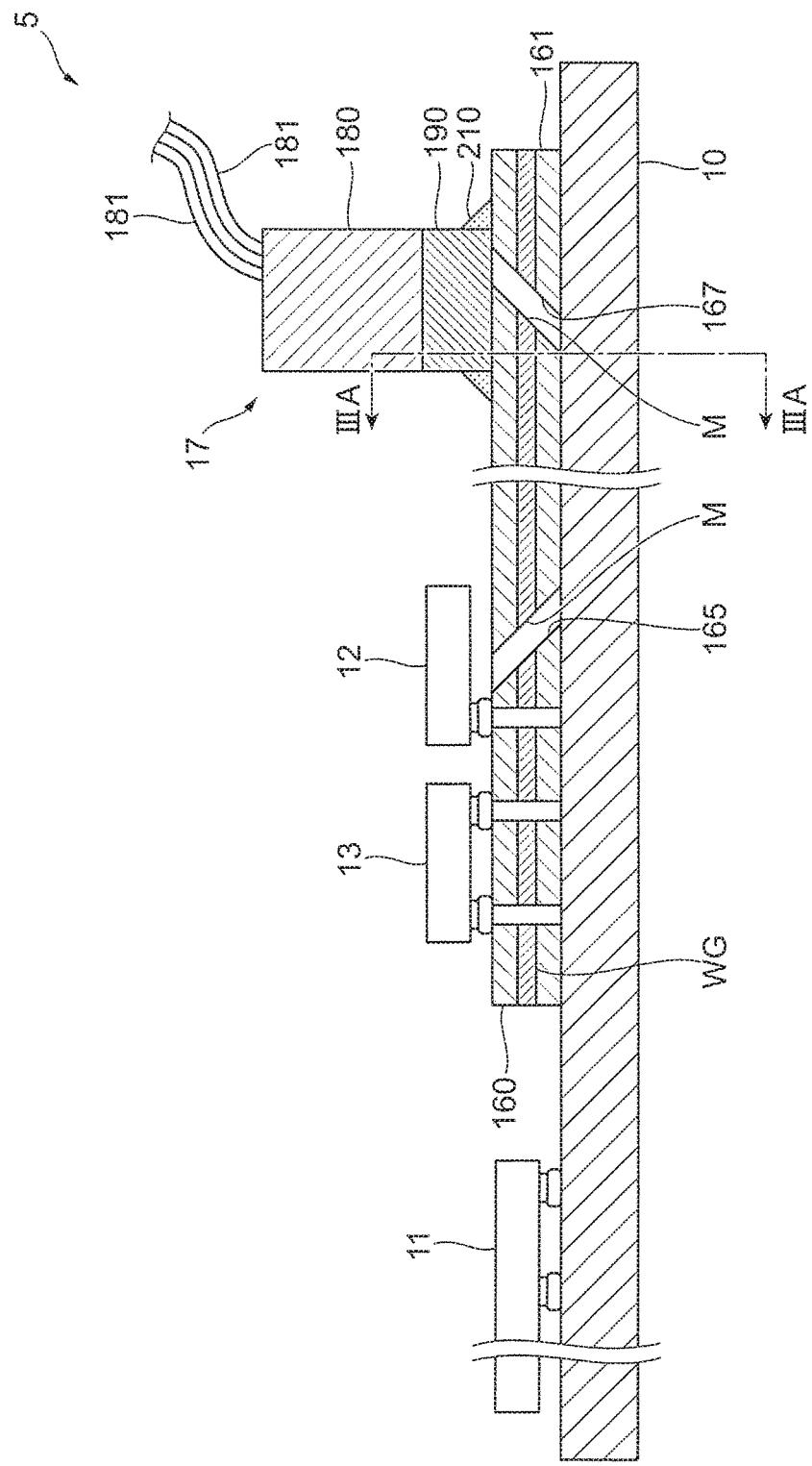
FIG. 2 depicts a side view of the MCM according to embodiments of the present invention.

Referring to FIG. 2, there is shown a side view of the MCM 5 according to the first embodiment. As shown in the figure, the waveguide layer 161 can be formed on the surface of the main substrate 10. The waveguide layer 161 can include the waveguide cores WG and a cladding layer 160. The waveguide layer 161 can be formed as a polymer waveguide.

The waveguide layer 161 can be provided with multiple mirror cavities 165. The mirror cavities 165 are provided at one end of the waveguide cores WG (left side in FIG. 2) and opposed to the VCSEL chip array 12. Each mirror cavity 165 is provided on each waveguide core WG. In other words, the number of the mirror cavities 165 matches the number of the waveguide cores WG.

The waveguide layer 161 can also be provided with multiple mirror cavities (mirror ablation holes) 167. The mirror cavities 167 are provided at the other end of the waveguide cores WG (right side in FIG. 2) and opposed to the fiber connector 17. Each mirror cavity 167 is provided on each waveguide core WG. In other words, the number of the mirror cavities 167 matches the number of the waveguide cores WG. The mirror cavity 167 is an example of a cavity.

The mirror cavities 165 and 167 can be inclined at an angle of 45° to form reflective surfaces (mirrors M), on boundaries (interfaces) between the waveguide cores WG and the mirror cavities 165 or the mirror cavities 167. In an embodiment, the boundaries can be provided without a metal coating, and the mirror cavities 165 and 167 can be filled with air (atmosphere). This configuration enables the mirrors M to reflect the light by total internal reflection (TIR). More specifically, the mirrors M of the mirror cavities 165 reflect the light from the VCSEL chip array 12 to the waveguide cores WG by total internal reflection. The mirrors M of the mirror cavities 167 reflect the light from the waveguide cores WG to the fiber connector 17 by total internal reflection.

Note that in an embodiment, the mirrors M of the mirror cavities 167 are provided in staggered positions in the waveguide cores WG to form two rows (refer to FIG. 3B.)

The fiber connector 17 can include a fiber side component 180 and a substrate side component 190. The fiber side component 180 connected to the fiber cables 181 and 182 can be mounted on the substrate side component 190. The substrate side component 190 can be directly mounted on the waveguide layer 161 to receive the fiber side component 180.

The substrate side component 190 is glued onto the waveguide layer 161 using an underfilling material, i.e. an adhesive 210. The adhesive 210 can be a photocurable material, such as ultraviolet (UV) curing resin or a thermal curing material.

Next, an explanation is given about the general method for fixing the fiber connector 17 to the waveguide layer 161 in the first embodiment with reference to FIG. 2. Note that the mirror cavities 165 and 167 are assumed to have been provided on the surface of the waveguide layer 161 with conventional techniques, such as laser processing or dicing.

The substrate side component 190 of the fiber connector 17 is first mounted on the waveguide layer 161. The adhesive 210 in a fluidized state is applied around the substrate side component 190. The adhesive 210 distributes through a gap GP (refer to FIG. 3A) between the bottom surface of the substrate side component 190 and the top surface of the waveguide layer 161 due to capillary effect.

Curing light is then directed towards the gap GP from above to cure the adhesive 210. This enables to fix the substrate side component 190 to the waveguide layer 161. The fiber side component 180 to which the fiber cables 181 and 182 has been connected is mounted on the substrate side component 190.

Figure 3C:
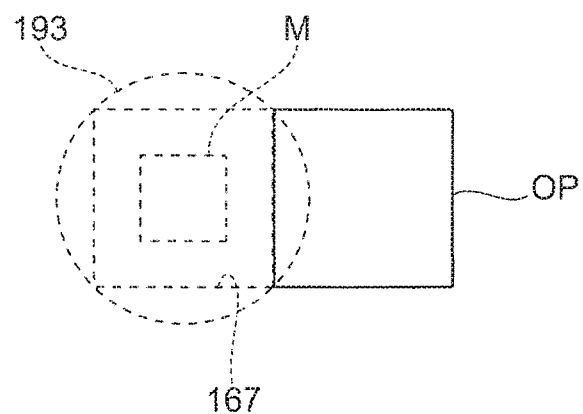
FIG. 3C depicts a top view of the opening according to embodiments of the present invention.
Figure 3D:
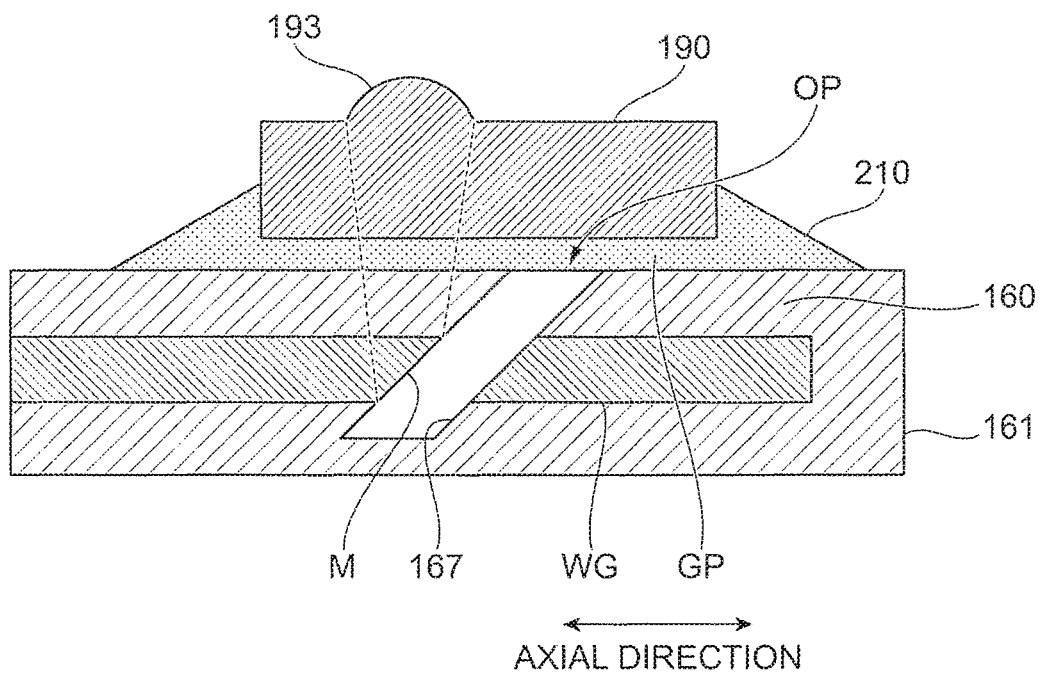
FIG. 3D depicts a schematic cross-sectional view taken along the line IIID-IIID in FIG. 3B.

FIG. 3A depicts a schematic cross-sectional view taken along the line IIIA-IIIA in FIG. 2. FIG. 3B depicts a top view of the substrate side component 190 according to some embodiments of the present invention. FIG. 3C depicts a top view of the opening OP according to embodiments of the present invention. FIG. 3D depicts a schematic cross-sectional view taken along the line IIID-IIID in FIG. 3B.

As shown in FIGS. 3A and 3B, the substrate side component 190 can have a generally rectangular parallelepiped shape. The substrate side component 190 can include a substrate side microlens array 191, first support portions 194, and second support portions 195. In this embodiment, the substrate side component 190 can be configured as a single piece.

The microlens array 191 can be provided on the top surface of the substrate side component 190. The microlens array 191 can include multiple microlenses 193. The microlens array 191 is arranged in two rows corresponding to the rows of the mirrors M of the mirror cavities 167. The microlens 193 is an example of lens.

The substrate side component 190 can be positioned on the waveguide layer 161 so that each microlens 193 is aligned with the corresponding mirror M provided on each waveguide core WG (refer to FIG. 3C). Note that the fiber side component 180 can also include a fiber side microlens array (not shown). Each microlens 193 of the substrate side component 190 is aligned with each fiber side microlens. This configuration allows the light reflected at the mirror M to pass the microlens 193 of the substrate side component 190 and the corresponding microlens of the fiber side component 180.

The first support portions 194 are protruded portions on the top surface of the substrate side component 190. The first support portions 194 can be provided on both sides in the longitudinal direction of the substrate side component 190. The first support portions 194 support the fiber side component 180. In this embodiment, the microlens array 191 is provided between the first support portions 194.

The second support portions 195 are protruded portions on the bottom surface of the substrate side component 190. The second support portions 195 can be provided on both sides in the longitudinal direction of the substrate side component 190. The second support portions 195 can be mounted on the waveguide layer 161. Note that an area between the second support portions 195 is hereinafter called a central area 196. The height of the second support portions 195 is set to form the gap GP through which the adhesive 210 distributes due to capillary effect.

The bottom surface of the substrate side component 190, more specifically the central area 196, is opposed to the area of the upper surface of the waveguide layer 161 in which the mirror cavities 167 are provided. In other words, the substrate side component 190 can cover the mirror cavities 167.

As mentioned above, the substrate side component 190 can be fixed using the adhesive 210. As shown in FIG. 3D, the gap GP between the bottom surface of the substrate side component 190 and the top surface of the waveguide layer 161 can be filled with the adhesive 210. The adhesive 210 in the gap GP may be required to provide sufficient mechanical stability (mechanical support) between the substrate side component 190 and the waveguide layer 161.

The substrate side component 190 is an example of an optical component or an example of a second component. The bottom surface of the substrate side component 190 is an example of a second surface of the optical component. The waveguide layer 161 is an example of a substrate or an example of a first component. The top surface of the waveguide layer 161 is an example of a first surface of the substrate. The adhesive 210 is an example of a fluid.

The adhesive 210 also acts as an index-matching substance to reduce reflection loss at the gap GP. More specifically, the light coming from the mirror M to the microlens 193 passes the gap GP. Filling the gap GP with the adhesive 210 enables to reduce difference in refractive index between the adhesive 210 in the gap GP and the substrate side component 190 or the waveguide layer 161, compared with the gap GP filled with air. Filling the gap GP with the adhesive 210 also enables to eliminate an air boundary in the gap GP.

As previously mentioned, the adhesive 210 in a fluidized state distributes through the gap GP due to capillary effect. Controlling a flow of the adhesive 210 may influence a yield in the manufacturing process, i.e. the lens assembling process, of the optical communication system 1 (refer to FIG. 1).

Figure 4A:
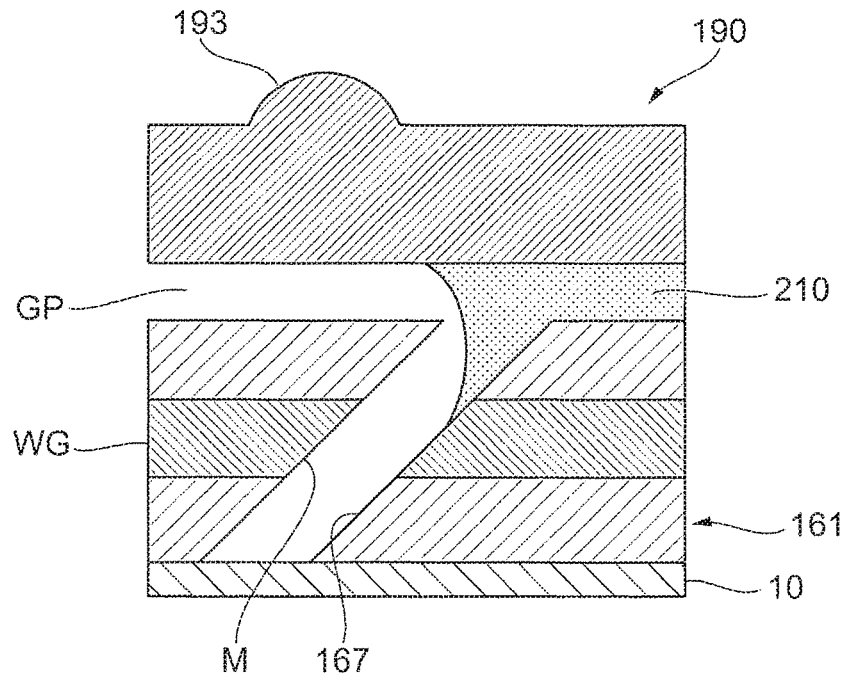
FIGS. 4A and 4B depict a flow of the adhesive around the mirror cavities in a comparative example.
Figure 4B:
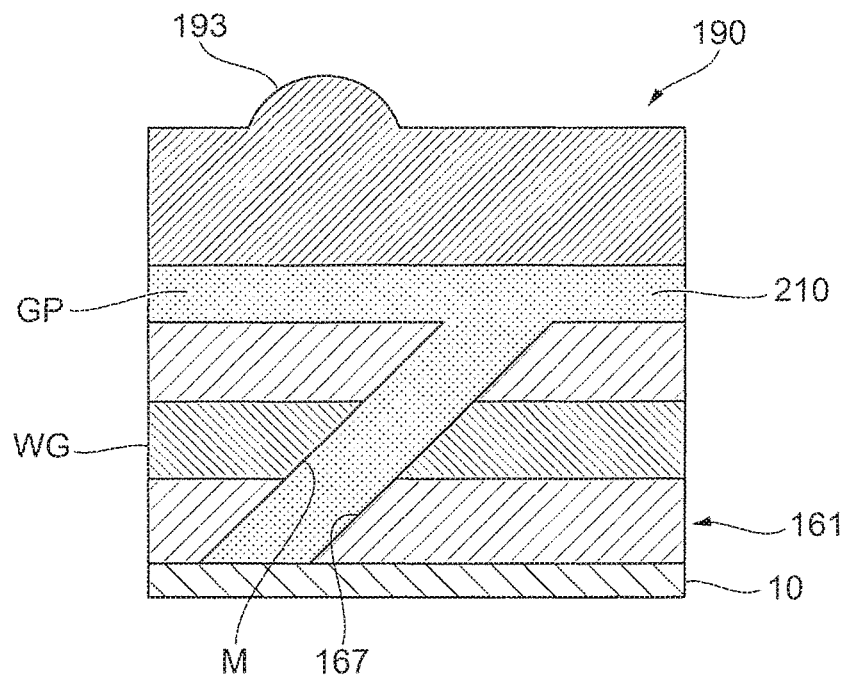

Referring to FIGS. 4A and 4B, there is shown a flow of the adhesive 210 around the mirror cavities 167 in a comparative example. As shown in FIG. 4A, the fluidized adhesive 210 can distribute through the gap GP. The distributing adhesive 210 can flow into the mirror cavities 167, as shown in FIG. 4B. Such flow of the adhesive 210 into the mirror cavities 167 can decline the reflectivity at the mirror M. In other cases, the adhesive 210 may not completely fill the gap GP. Such insufficient filling of the adhesive 210 may decline the transmittance of the gap GP.

To prevent a low yield, a sidefill process may be applicable to apply the adhesive 210, instead of this comparative example. However, this configuration may reduce the mechanical strength between the substrate side component 190 and the waveguide layer 161, or may introduce reflection loss at the gap GP (at air interfaces.)

Figure 5B:
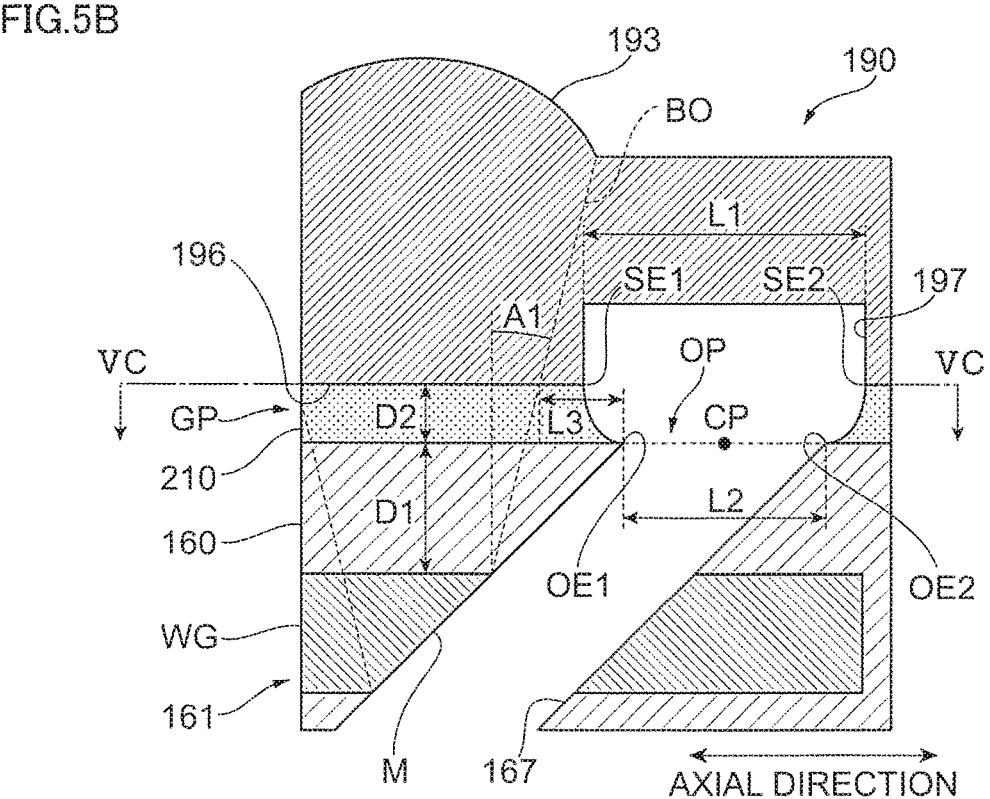
FIG. 5B depicts a side view of an area around the mirror cavities according to the first embodiment.
Figure 5C:
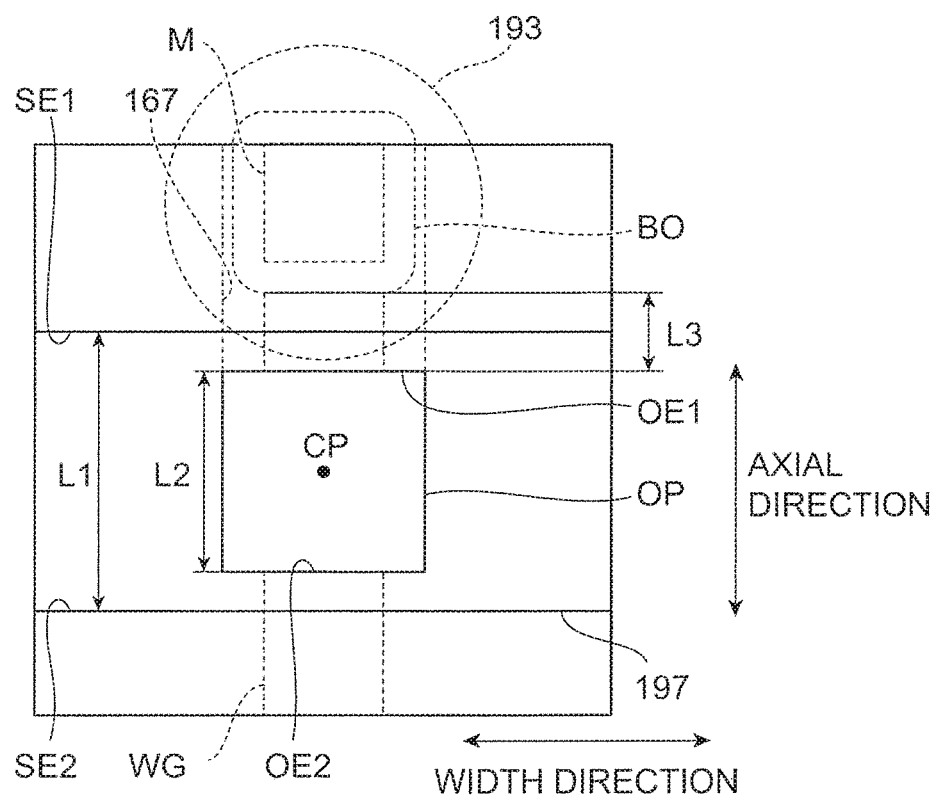
FIG. 5C depicts a cross-sectional view taken along the line VC-VC in FIG. 5B.

FIG. 5A depicts a bottom view of the substrate side component 190 according to the first embodiment. FIG. 5B depicts a side view of an area around the mirror cavities 167 according to the first embodiment. FIG. 5C depicts a cross-sectional view taken along the line VC-VC in FIG. 5B.

As shown in FIG. 5A, the substrate side component 190 can include grooves 197. The grooves 197 can be provided on the bottom surface of the substrate side component 190 in the central area 196. The grooves 197 are arranged in two rows corresponding to the rows of the microlens array 191, in other words, corresponding to the rows of the mirror cavities 167. The groove 197 is an example of a recess.

Note that the groove 197 is an example of a recess on the bottom surface of the substrate side component 190. The groove 197 enlarges the height (size) of the gap GP. In other words, the gap size increases abruptly in the groove 197. In the embodiment, the cross-sectional shape of the groove 197 is rectangular (refer to FIG. 5B).

As shown in FIG. 5B, each of the grooves 197 can be opposed to an opening OP of the mirror cavities 167. Also, as shown in FIG. 5C, each of the grooves 197 can cover the opening OP of the mirror cavities 167 in a top view.

Next, an explanation is given about the dimension of the groove 197 in this embodiment with reference to FIGS. 5B and 5C.

In the following explanation, the direction along the axis of the waveguide core WG is hereinafter called an axial direction. The direction perpendicular to the axis of the waveguide core WG is hereinafter called a width direction. The edges of the groove 197 in the axial direction are hereinafter called a first groove edge SE1 (left side in FIG. 5B) and a second groove edge SE2 (right side in FIG. 5B), respectively. The edges of each mirror cavity 167 in the axial direction are hereinafter called a first cavity edge OE1 (left side in FIG. 5B) and a second cavity edge OE2 (right side in FIG. 5B). The center of the opening OP is hereinafter called a center CP. Note that each mirror cavity 167 and the top surface of the microlens array 191 make an acute angle at the first cavity edge OE1, and make an obtuse angle at the second cavity edge OE2.

In the embodiment, the length L1 of the groove 197 in the axial direction can be longer than the length L2 of the opening OP in the axial direction. The length L2 can be 10 um to 100 um (micrometer), preferably 25 um to 75 um, more preferably 45 um to 55 um. The length L1 can be 10 um to 100 um, preferably 30 um to 80 um, more preferably 60 um to 70 um. In the embodiment, each of the grooves 197 can cover the opening OP to some extent (e.g. 10%), or fully cover the opening OP (e.g. more than 110%).

In the axial direction, the first groove edge SE1 can be on the farther side from the center CP than the first cavity edge OE1. The second groove edge SE2 can be on the farther side from the center CP than the second cavity edge OE2.

Here, as shown in FIG. 5B, the light reflected at the mirror M is directed towards the microlens 193 while expanding the beam outline BO. In the embodiment, to prevent the light from passing the grooves 197, the first groove edge SE1 is on the outside of the beam outline BO. In other words, the grooves 197 are provided on a position separated from the beam outline BO. The beam outline BO is an example of a light path.

With the following dimensions, there is an approximately 10 um (micro meter) margin to offset the first groove edge SE1 towards the beam outline BO from the first cavity edge OE1. In other words, the length L3 between the first cavity edge OE1 and the beam outline BO on a plane including the bottom surface of the central area 196 is approximately 10 um. The detailed dimensions are as follows: the diameter of the waveguide core WG is 25 um; the diameter of the microlens 193 is 250 um; the spread angle A1 of the light reflected at the mirror M is 12 degrees; the thickness D1 of the cladding layer 160 above the waveguide cores WG is 15 um; and the thickness D2 of the adhesive 210 is 10 um.

Here, the substrate side component 190 can be integrally formed by injection molding. In this case, the grooves 197 can be provided on the substrate side component 190 in the injection mold process. In other words, the grooves 197 can be readily imprinted by injection molding. This reduces an additional cost for fabrication of the grooves 197. However, the methods for forming the substrate side component 190 and the grooves 197 are not limited to this. For example, the substrate side component 190 with the grooves 197 can be formed by a 3D printer. Alternatively, the grooves 197 can be formed on the substrate side component 190 after form-ing the substrate side component 190. For example, the grooves 197 can be formed by laser processing or dicing.

In an embodiment, an improved control of capillary flow of the adhesive 210 can lead to a higher yield in the assembling process (lens assembling process) of the optical communication system 1. Note that the adhesive 210 in the gap GP, i.e. underfilling adhesive can provide better mechanical strength than sidefilling.

Figure 6:
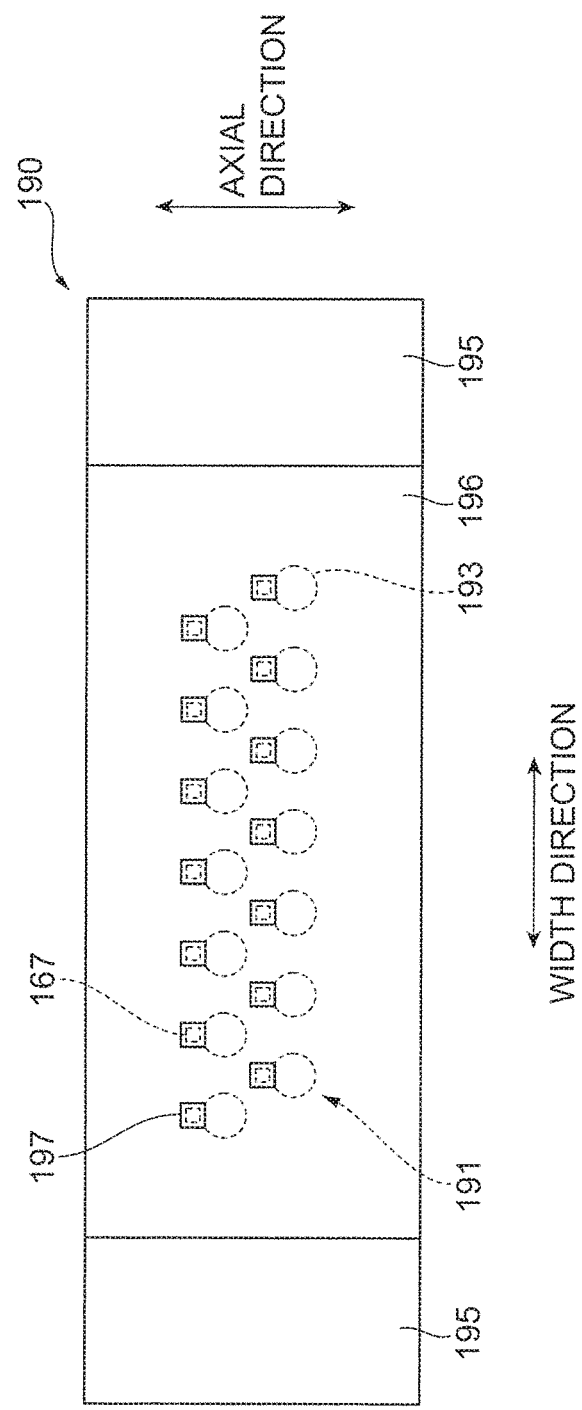
FIG. 6 depicts a bottom view of the substrate side component according to embodiments of the present invention.

FIG. 6 depicts a bottom view of the substrate side component 190 according to the first modification of the first embodiment. As shown in FIG. 6, the substrate side component 190 can be provided with multiple dispersed grooves 197. Each groove 197 may have a generally square shape in a plane view. Each groove 197 can be provided on a position corresponding to each microlens 193. The grooves 197 can be opposed to the corresponding mirror cavities 167 to prevent (suppress) the entrance of the adhesive 210 into the mirror cavities 167. In other words, the grooves 197 can prevent the adhesive 210 from reaching the mirror M.

FIG. 7A depicts a configuration for simulation of fluid dynamics of the adhesive 210.

Figure 7D:
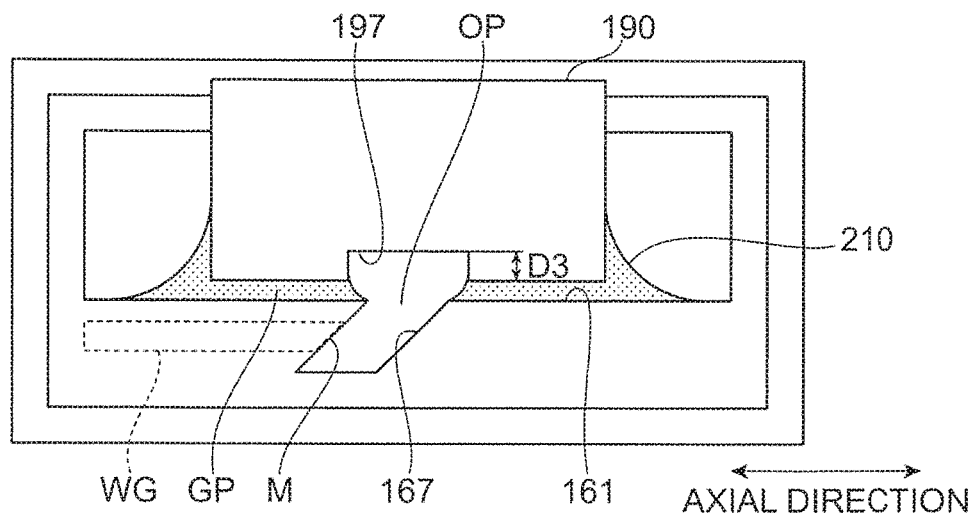
FIG. 7D depicts a simulation result of the flow of the adhesive in a direction parallel to the waveguide cores with the grooves according to embodiments of the present invention.
Figure 7E:
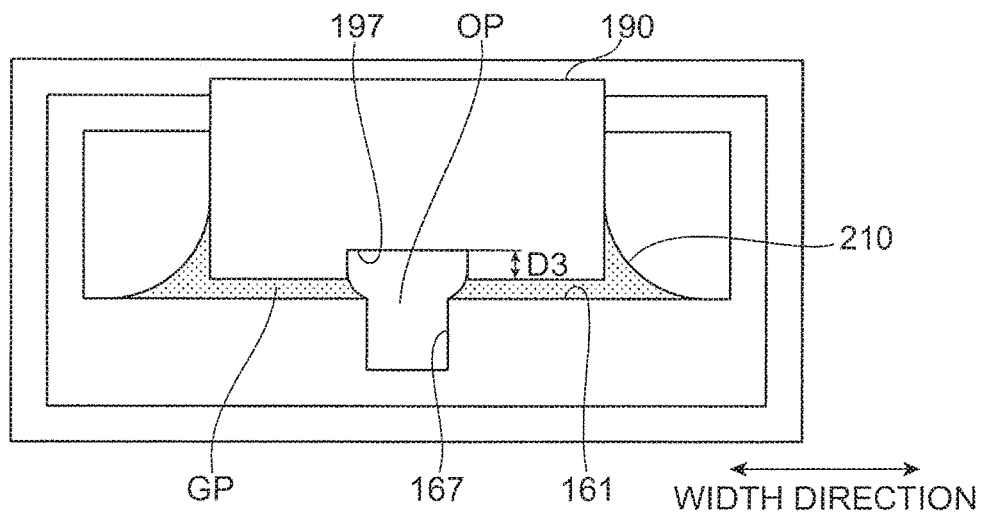
FIG. 7E depicts a simulation result of the flow of the adhesive in a direction perpendicular to the waveguide cores with the grooves according to embodiments of the present invention.

FIG. 7B depicts a simulation result of the flow of the adhesive 210 in a direction parallel to the waveguide cores WG without the grooves 197 according to a comparative example. FIG. 7C depicts a simulation result of the flow of the adhesive 210 in a direction perpendicular to the waveguide cores WG without the grooves 197 according to the comparative example. FIG. 7D depicts a simulation result of the flow of the adhesive 210 in a direction parallel to the waveguide cores WG with the grooves 197 according to the first modification of the first embodiment. FIG. 7E depicts a simulation result of the flow of the adhesive 210 in a direction perpendicular to the waveguide cores WG with the grooves 197 according to the first modification of the first embodiment.

An explanation is given about the simulation of fluid dynamics of the adhesive 210 around the grooves 197. Each groove 197 has a square shape (refer to FIG. 6). The simulation of fluid dynamics is conducted in a two dimensional flow.

As shown in FIG. 7A, the general configuration for the simulation includes the substrate side component 190 and the waveguide layer 161 provided with the mirror cavities 167. The substrate side component 190 and the waveguide layer 161 are provided in the atmosphere. In the initial state, the adhesive 210 in a fluidized state is enclosed in fields on both sides of the substrate side component 190, and then to start to flow from the enclosed fields.

The properties of the adhesive 210 in a fluidized state are as follows: the density is $10^3$ kg/m$^3$; the viscosity is 0.1 Pa·s (the kinetic viscosity is $10^{-4}$ m$^2$/s); the surface tension is 0.03 N/m. As to the surface properties, the contact angle is 24 degrees. The depth of the groove 197 of FIGS. 7D and 7E is 30 um (micro meter).

As shown in FIGS. 7B and 7C, the simulation results without the grooves 197 indicate that the adhesive 210 may flow into the mirror cavities 167 (refer to arrows A1 and A2). In other words, the adhesive 210 will eventually (for example, in more than 5 seconds) fall into the mirror cavities 167. On the other hand, as shown in FIGS. 7D and 7E, the simulation results with the grooves 197 indicate that the adhesive 210 does not flow into the mirror cavities 167. According to this simulation, providing the grooves 197 on the substrate side component 190 may prevent the adhesive 210 from flowing into the mirror cavities 167.

Figure 8A:
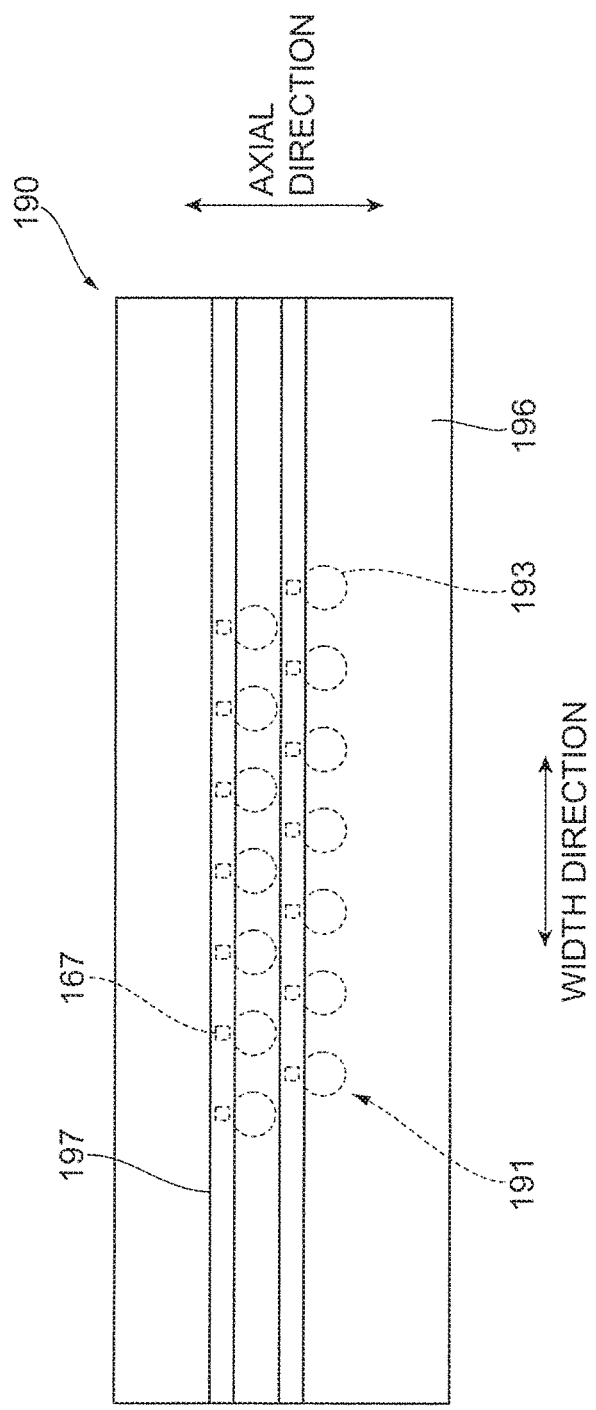
FIGS. 8A and 8B depict a bottom view of the substrate side component according to some embodiments of the present invention.
Figure 8B:
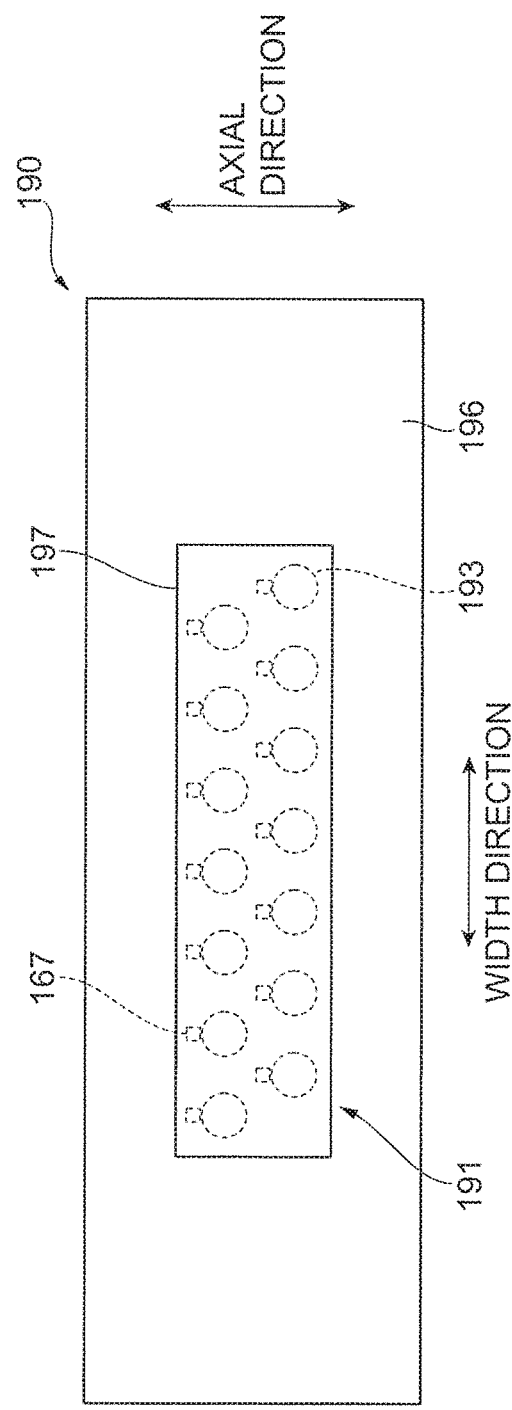
Figure 8C:
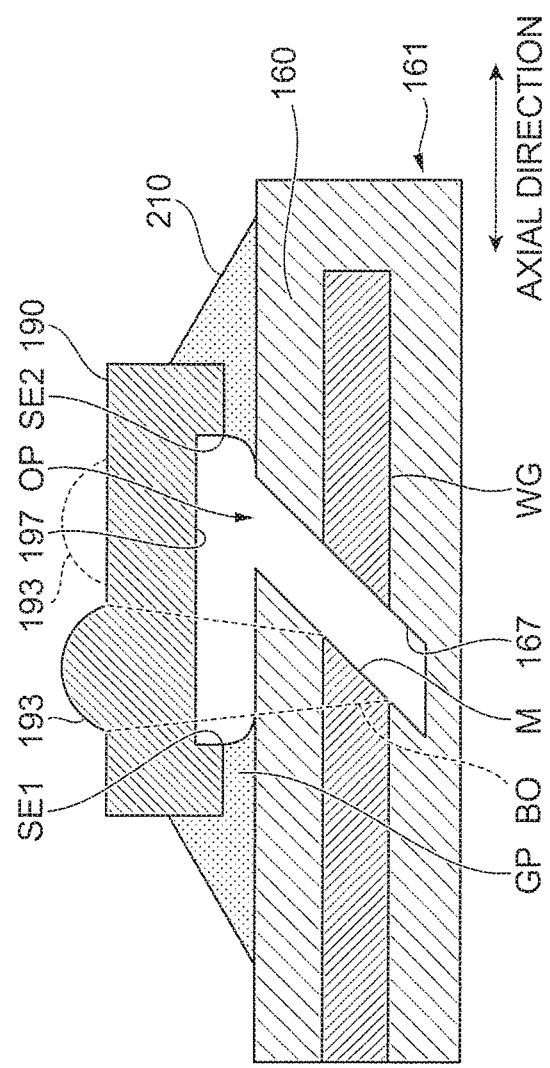
FIGS. 8C, 8D and 8E depict a side view of an area around the mirror cavities according to the embodiments of the present invention.
Figure 8D:
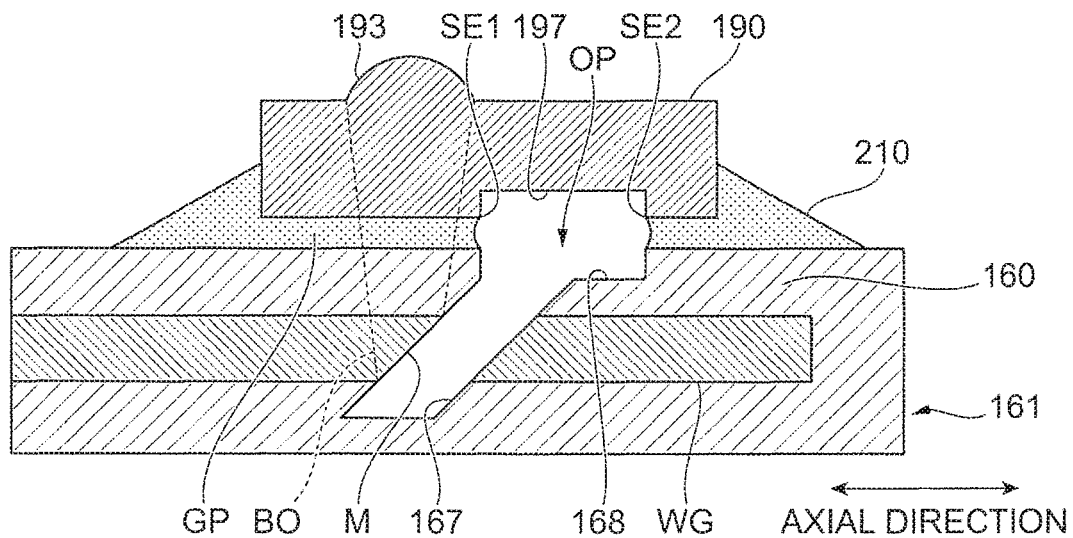
Figure 8E:
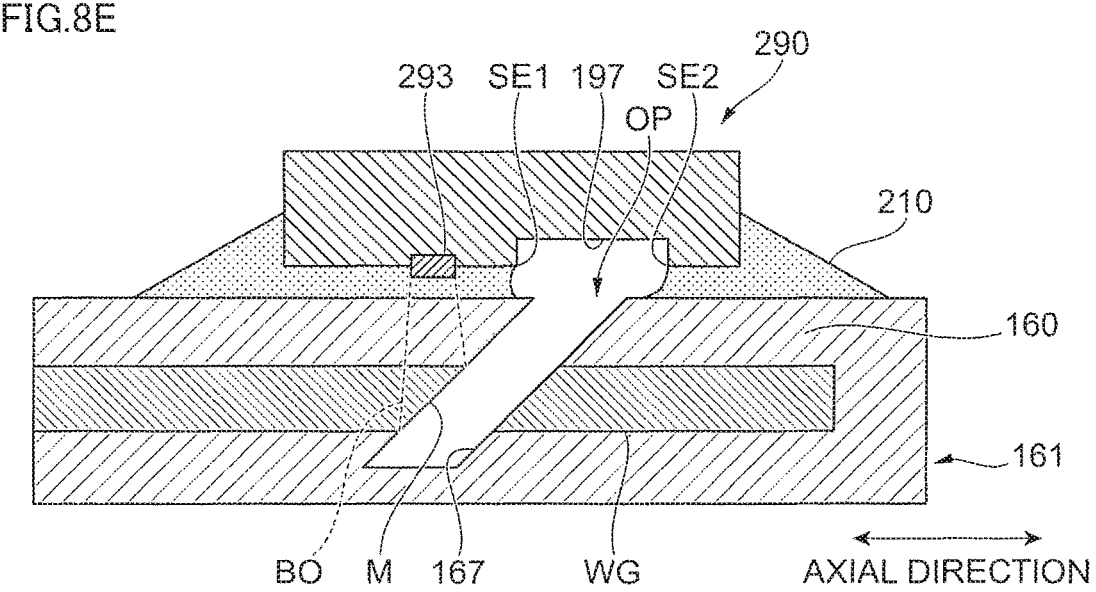

FIGS. 8A and 8B depict a bottom view of the substrate side component 190 according to the second and the third modification of the first embodiment. FIGS. 8C, 8D and 8E depict a side view of an area around the mirror cavities 167 according to the third, the forth, and the fifth modification of the first embodiment, respectively.

As shown in FIG. 8A, the grooves 197 can extend over the entire length in the longitudinal direction of the substrate side component 190. In the modification, the substrate side component 190 is provided without the second support portions 195 (refer to FIG. 3A), so that the grooves 197 may be linearly extended on the bottom surface of the substrate side component 190.

As shown in FIGS. 8B and 8C, the groove 197 can be formed with a wider width to cover the all area provided with the microlenses 193. In the modification, the groove 197 extends across the beam outline BO. More specifically, as shown in FIG. 8C, the first groove edge SE1 and the second groove edge SE2 may be arranged opposite to each other across the beam outline BO. Although the light beam traverses the air-material interfaces twice, causing reflection loss in this configuration, a part of the volume of the gap GP is filled with the adhesive 210, providing better mechanical stability than side filling.

As shown in FIG. 8D, in addition to the grooves 197, waveguide grooves 168 can be provided on the top surface of the waveguide layer 161. The waveguide grooves 168 can be opposed to the grooves 197. The waveguide grooves 168 and the grooves 197 can enlarge the height of the gap GP to prevent the adhesive 210 from flowing into the mirror cavities 167.

The above mentioned configurations may also be applicable to any optical component (optoelectronic chip), such as a vertical cavity surface emitting laser (VCSEL) chip, a photodiode (PD) chip, a lens array component. For example, as shown in FIG. 8E, a VCSEL chip 290 including an active area 293 can be directly mounted on the waveguide layer 161. The VCSEL chip 290 can be provided with the grooves 197 on the bottom surface of the VCSEL chip 290. The grooves 197 can prevent the adhesive 210 from flowing into the mirror cavities 167. Note that the above mentioned configurations can also be applicable to any component. For example, a first component can be provided with a cavity on a first surface of the first component. A second component can be on the first component with a recess on the bottom surface of the second component. The recess can prevent the fluid from flowing into the cavity.

FIGS. 9A, 9B, 9C, 9D, 9E and 9F depict a cross-sectional view of the groove 197 according to other modifications of the first embodiment. The cross-sectional shape of the groove 197 may not be limited to the rectangular shape as shown in FIG. 5C as long as the groove enlarges the height of the gap GP.

As shown in FIGS. 9A and 9B, the cross-sectional shape of the groove 197 can be a trapezoid shape. In the modification shown in FIG. 9A, the length L1 of the groove 197 in the axial direction increases gradually from the bottom of the groove 197 to the opening of the groove 197. In the modification shown in FIG. 9B, the length L1 of the groove 197 in the axial direction decreases gradually from the bottom of the groove 197 to the opening of the groove 197.

As shown in FIG. 9C, the cross-sectional shape of the groove 197 can be a curved shape. As shown in FIG. 9D, the cross-sectional shape of the groove 197 can be a generally rectangular shape with round corners. As shown in FIG. 9E, the cross-sectional shape of the groove 197 can be a V-shape. As shown in FIG. 9F, the groove 197 can be provided with an uneven bottom.

Figure 10A:
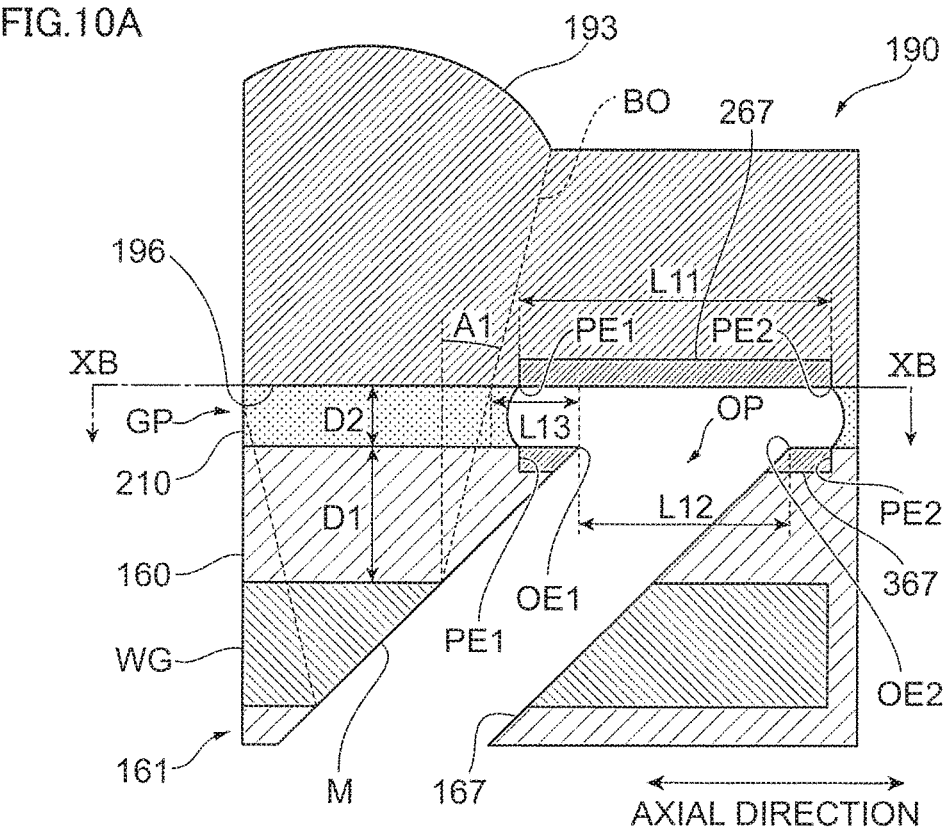
FIG. 10A depicts a side view of an area around hydrophobic areas according to some embodiments of the present invention.
Figure 10B:
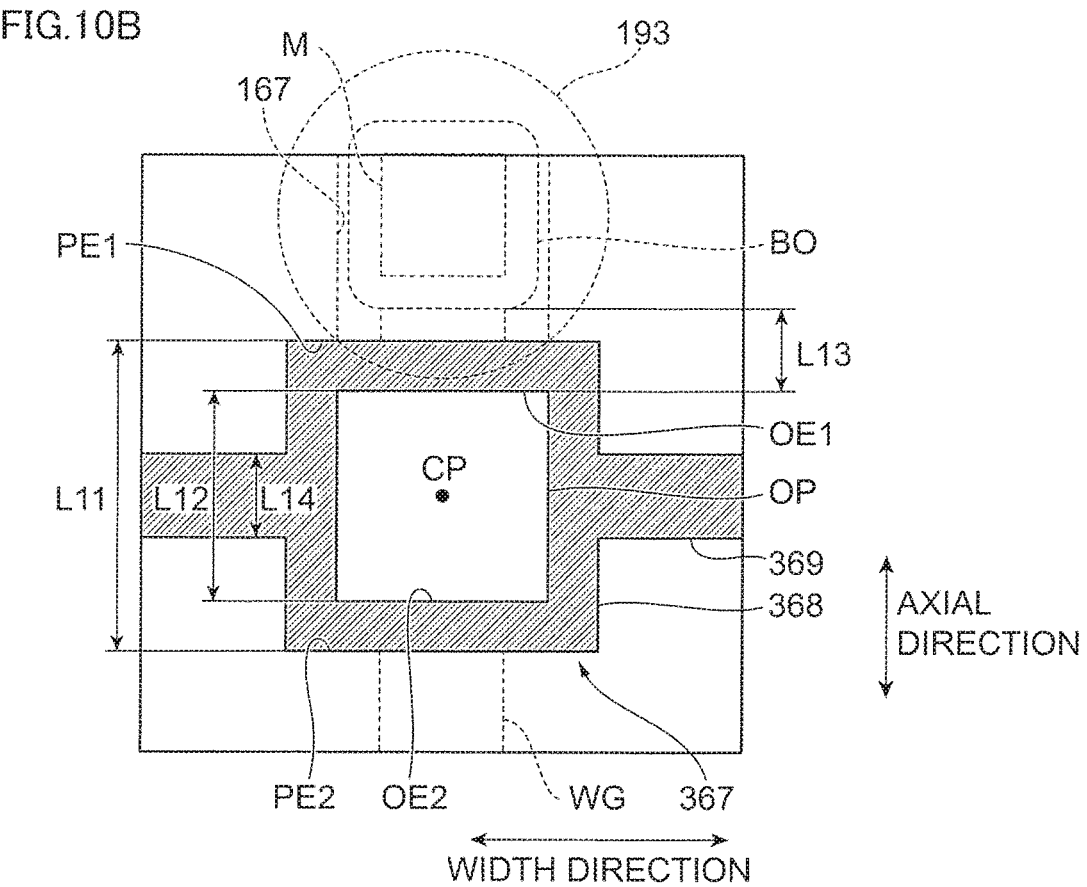
FIG. 10B depicts a cross-sectional view taken along the line XB-XB in FIG. 10A.
Figure 11A:
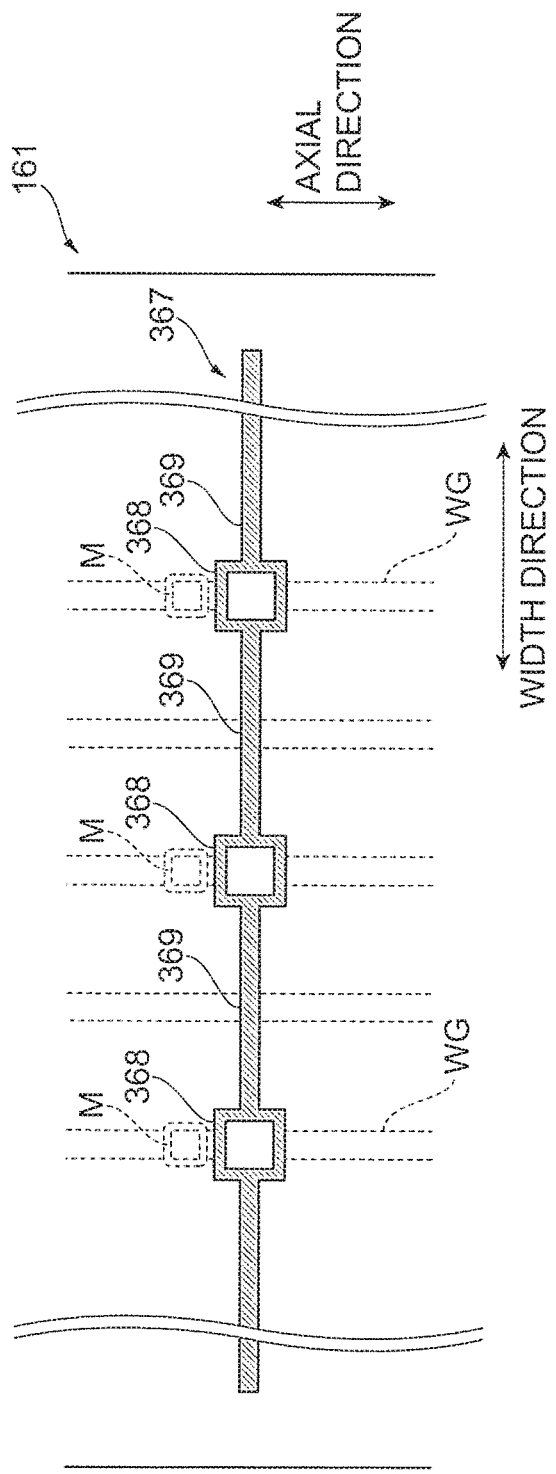
FIG. 11A depicts a top view of the waveguide layer according to some embodiments of the present invention.
Figure 11B:
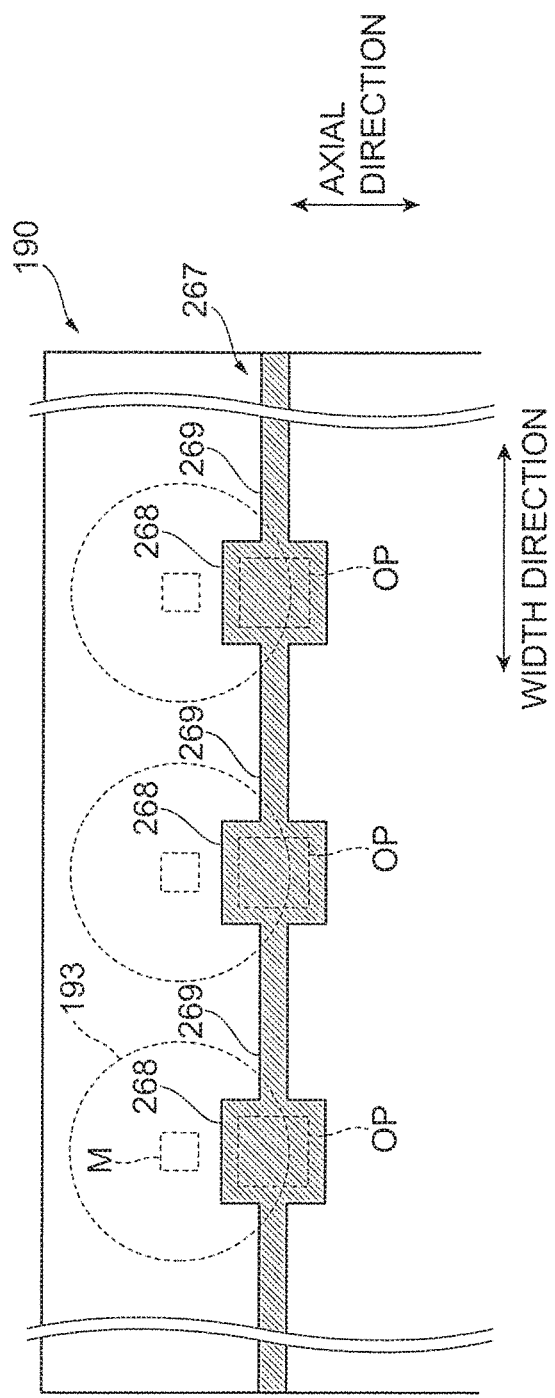
FIG. 11B depicts a bottom view of the substrate side component according to some embodiments of the present invention.

FIG. 10A depicts a side view of an area around hydrophobic areas 267 and 367 according to the second embodiment. FIG. 10B depicts a cross-sectional view taken along the line XB-XB in FIG. 10A. FIG. 11A depicts a top view of the waveguide layer 161 according to the second embodiment. FIG. 11B depicts a bottom view of the substrate side component 190 according to the second embodiment.

As shown in FIGS. 10A and 10B, the substrate side component 190 and the waveguide layer 161 can include hydrophobic areas 267 and 367, respectively. The hydrophobic area 267 can be provided on the bottom surface of the substrate side component 190 in the central area 196. The hydrophobic area 367 can be provided on the top surface of the waveguide layer 161 around the opening OP of each mirror cavity 167. In the embodiment, the hydrophobic areas 267 and 367 can have a corresponding shape and are opposed to each other.

The hydrophobic areas 267 and 367 are examples of a predetermined portion arranged around the cavity. The hydrophobic areas 267 and 367 are an example of a treated surface having a poor wettability to a liquid adhesive than other areas surrounding the treated surface.

As shown in FIG. 11A, the hydrophobic area 367 of the waveguide layer 161 can include main areas 368 and band areas 369. Each of the main areas 368 can have a generally square shape with its middle part cut off as the opening OP. In other words, each of the main areas 368 surrounds the opening OP of each mirror cavity 167. The band areas 369 can extend along the width direction between the edges of the substrate side component 190. In other words, the band areas 369 can extend across the main areas 368 to connect them.

As shown in FIG. 11B, the hydrophobic area 267 of the substrate side component 190 can include main areas 268 and band areas 269. Each of the main areas 268 can have a generally square shape. Note that the main area 268 is provided without its middle part cut off as the opening OP. Each of the main areas 268 can be opposed to the opening OP of each mirror cavity 167. As shown in FIG. 11B, the main areas 268 on the substrate side component 190 can cover the opening OP of the mirror cavities 167 in a top view. The band areas 269 can extend along the width direction between the edges of the substrate side component 190. In other words, the band areas 269 can extend across the main areas 268 to connect them.

Next, an explanation is given about the dimension of the hydrophobic areas 267 and 367 in the second embodiment with reference to FIGS. 10A and 10B. In the following explanation, the edges of the hydrophobic areas 267 and 367 (main areas 268 and 368) in the axial direction are hereinafter called a first hydrophobic area edge PE1 and a second hydrophobic area edge PE2, respectively.

In an embodiment, the length L11 of the main areas 268 and 368 in the axial direction can be longer than the length L12 of the opening OP or the length L14 of the band area 369 in the axial direction.

The length L12 can be 10 um to 100 um (micrometer), preferably 25 um to 75 um, more preferably 45 um to 55 um. The length L11 can be 10 um to 100 um, preferably 30 um to 80 um, more preferably 60 um to 70 um. In the embodiment, each of the main areas 268 and 368 can cover the opening OP to some extent (e.g. 10%), or fully cover the opening OP (e.g. more than 110%).

In the axial direction, the first hydrophobic area edge PE1 can be on the farther side from the center CP than the first cavity edge OE1. The second hydrophobic area edge PE2 can be on the farther side from the center CP than the second cavity edge OE2.

Here, as shown in FIG. 10A, the light reflected at the mirror M is directed towards the microlens 193 while expanding the beam outline BO. In the embodiment, to prevent the light from passing the hydrophobic areas 267 and 367, the first hydrophobic area edge PE1 is on the outside of the beam outline BO. In other words, the hydrophobic areas 267 and 367 are provided on a position separated from the beam outline BO.

Here, there is an approximately 10 um (micro meter) margin to offset the first hydrophobic area edge PEI towards the beam outline BO. In other words, the length L13 between the first cavity edge OE1 and the beam outline BO on a plane including the bottom surface of the central area 196 is approximately 10 um. The dimensions of this configuration are the same as the above mentioned configuration shown in FIG. 5B.

The hydrophobic areas 267 and 367 are an example of selected areas to which a hydrophobic surface treatment is applied. The hydrophobic areas 267 and 367 may be provided just around the opening OP so that the adhesive 210 fills in the entire volume in which the light traverses.

In an embodiment, a contact angle of the hydrophobic areas 267 and 367 can be larger than that of an area surrounding the hydrophobic area 267 on the bottom surface of the substrate side component 190 or an area surrounding the hydrophobic area 367 on the top surface of the waveguide layer 161. In one example, the contact angle of the hydrophobic areas 267 and 367 may be 83 degrees and the contact angle of the surrounding area may be 7 degrees. In this example, the hydrophobic areas 267 and 367 are a fluoride hydrophobic coating and the adhesive 210 is UV curing resin having viscosity of 0.022 Pa·s.

However, the configuration of the hydrophobic areas 267 and 367 is not limited to this. The hydrophobic areas 267 and 367 may have a nano-structure. The nano-structure may be formed with plasma treatment, nanoimprint lithography, or ion-implantation process. For example, the nano-structure may include nanometer-sized pins which are aligned perpendicular to the surface of the substrate side component 190 or the waveguide layer 161. Alternatively, the hydrophobic areas 267 and 367 may be a heat curing adhesive.

In an embodiment, an improved control of capillary flow of the adhesive 210 can lead to a higher yield in the assembling process (lens assembling process) of the optical communication system 1. When the adhesive 210 infiltrates the gap GP in the assembling process, the band areas 369 can guide an air in the gap GP towards the outside of the gap GP in the width direction. This can prevent the pressured (heated) air in the gap GP from causing the poor bonding between the substrate side component 190 and the waveguide layer 161.

Next, an explanation is given about the fabrication process of the waveguide layer 161 and the substrate side component 190 according to the second embodiment.

Referring to FIGS. 12A and 12B, there are shown a top view and a side view, respectively, of the waveguide layer 161 at the first step of the fabrication process according to the second embodiment. At this step, the waveguide layer 161 can be prepared with conventional techniques. Note that the mirror cavities 167 have not been provided on the surface of the waveguide layer 161.

Referring to FIGS. 13A and 13B, there are shown a top view and a side view, respectively, of the waveguide layer 161 at the second step of the fabrication process. At this step, pattern masks PM are formed on the top surface of the waveguide layer 161. The pattern masks PM are disposed with an exposure area EA left between the pattern masks PM. The exposure area EA defines a shape of the hydrophobic area 367. Note that use of the pattern masks PM enables a precise selection of areas of the waveguide layer 161 to be treated.

Referring to FIGS. 14A and 14B, there are shown a top view and a side view, respectively, of the waveguide layer 161 at the third step of the fabrication process. At this step, hydrophobic surface treatment is applied (splayed) over the entire surface of the waveguide layer 161. In other words, the hydrophobic area 367 can be formed on the exposure area EA and the pattern masks PM.

Referring to FIGS. 15A and 15B, there are shown a top view and a side view, respectively, of the waveguide layer 161 at the fourth step of the fabrication process. At this step, the pattern masks PM are removed to leave the hydrophobic area 367 on the waveguide layer 161.

Referring to FIGS. 16A and 16B, there are shown a top view and a side view, respectively, of the waveguide layer 161 at the fifth step of the fabrication process. At this step, the mirror cavities 167 are formed by laser processing.

Figure 17A:
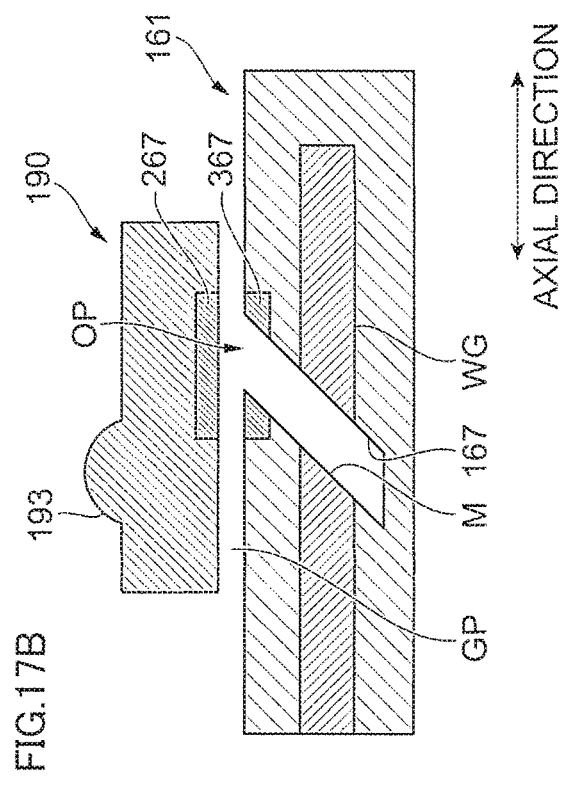
FIGS. 17A, 17B and 17C depict a top view, a side view, and a wide range top view, respectively, of the waveguide layer at the sixth step of the fabrication process.
Figure 17C:
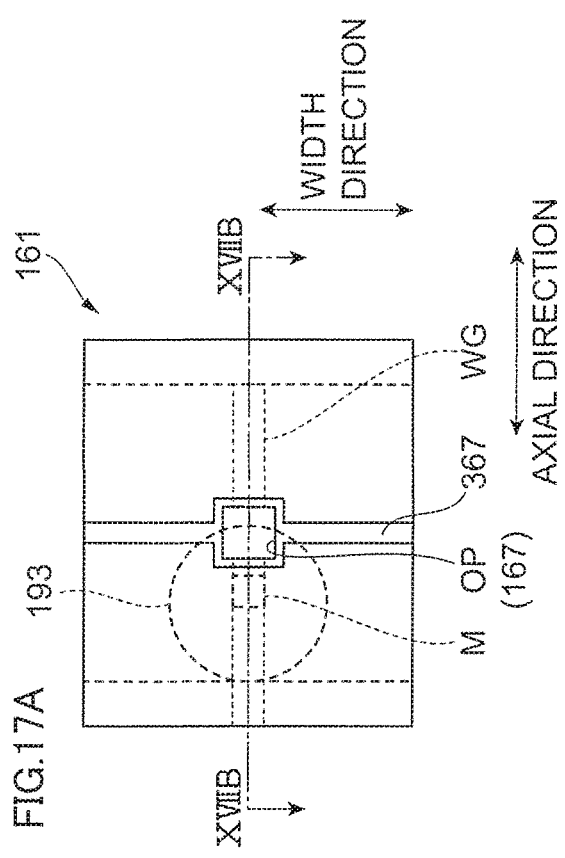
Figure 17B:
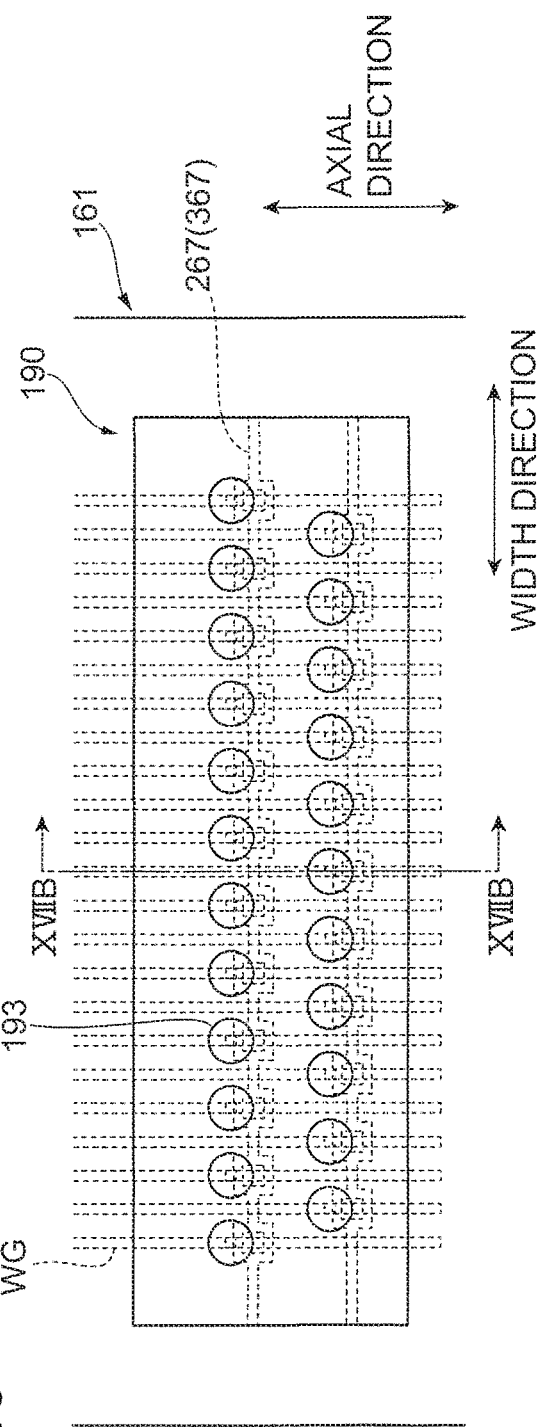

Referring to FIGS. 17A, 17B and 17C, there are shown a top view, a side view, and a wide range top view, respectively, of the waveguide layer 161 at the sixth step of the fabrication process. In the figures, pedestals are not shown. Note that the hydrophobic area 267 is assumed to have been provided on the bottom surface of the substrate side component 190 using the pattern masks PM for example. At this step, the substrate side component 190 is mounted on the waveguide layer 161. The gap GP is formed between the bottom surface of the substrate side component 190 and the top surface of the waveguide layer 161.

Figure 18A:
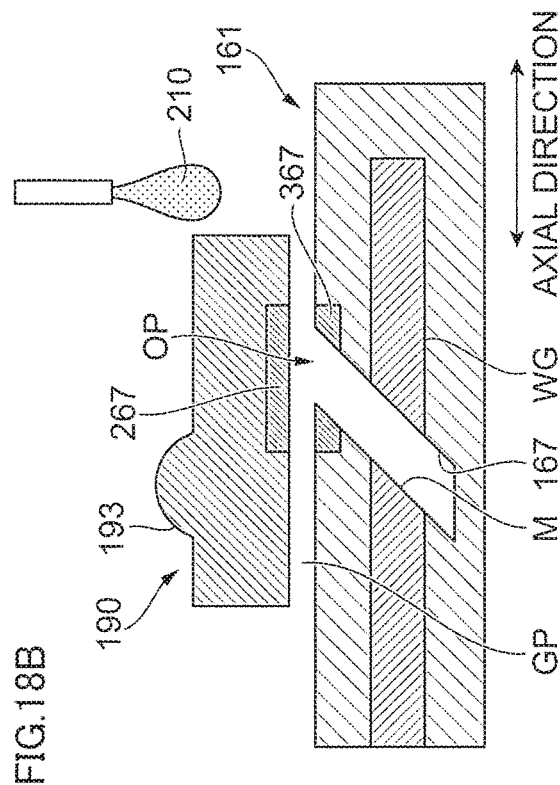
FIGS. 18A, 18B and 18C depict a top view, a side view, and a wide range top view, respectively, of the waveguide layer at the seventh step of the fabrication process.
Figure 18B:
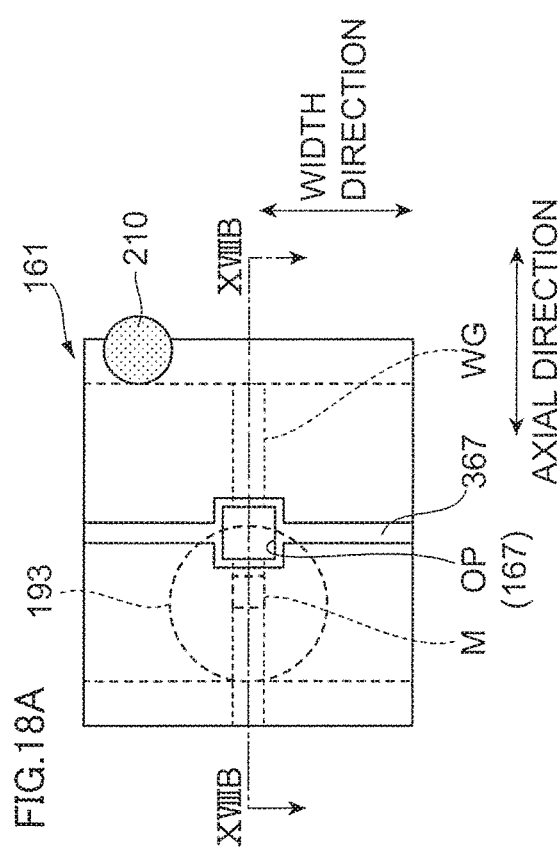
Figure 18C:
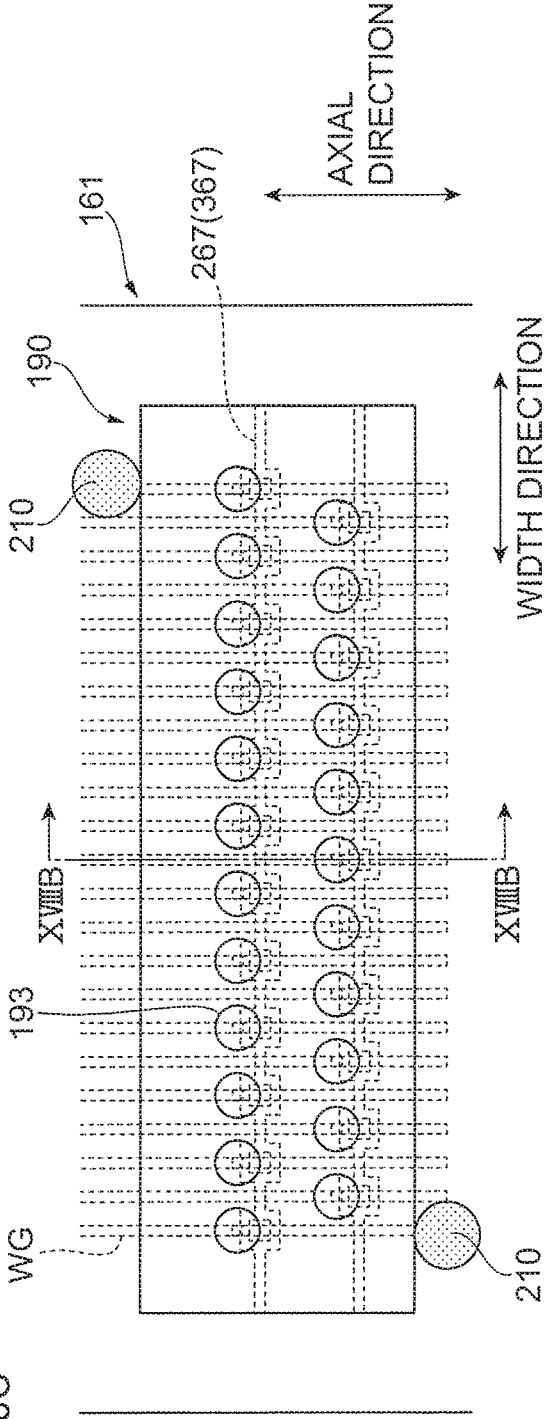

Referring to FIGS. 18A, 18B and 18C, there are shown a top view, a side view, and a wide range top view, respectively, of the waveguide layer 161 at the seventh step of the fabrication process. At this step, the adhesive 210 is applied to sides of the substrate side component 190. In the shown example, the adhesive 210 is applied on two points arranged opposite to each other across the substrate side component 190.

Referring to FIGS. 19A, 19B and 19C, there are shown a top view, a side view, and a wide range top view, respectively, of the waveguide layer 161 at the eighth step of the fabrication process. At this step, the adhesive 210 distributes through the gap GP due to capillary effect. The adhesive 210 is then cured by UV radiation so that the substrate side component 190 is fixed to the waveguide layer 161.

Figure 20A:
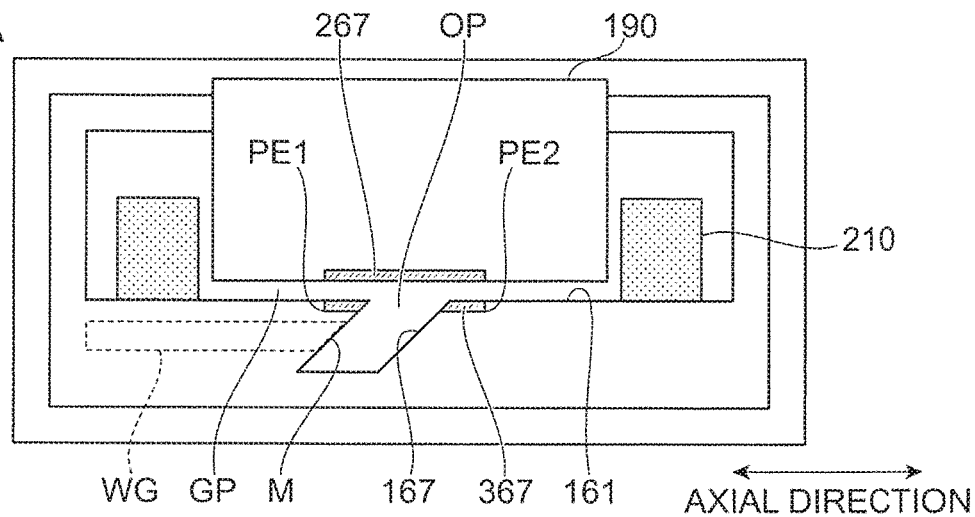
FIG. 20A depicts a configuration for simulation of fluid dynamics of the adhesive.
Figure 20B:
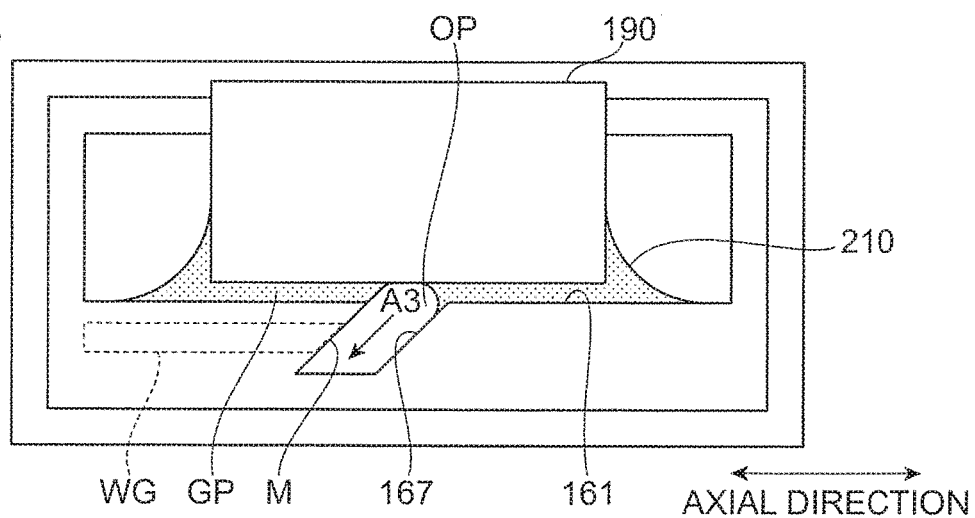
FIG. 20B depicts a simulation result of the flow of the adhesive in a direction parallel to the waveguide cores without the hydrophobic areas according to a comparative example.
Figure 20C:
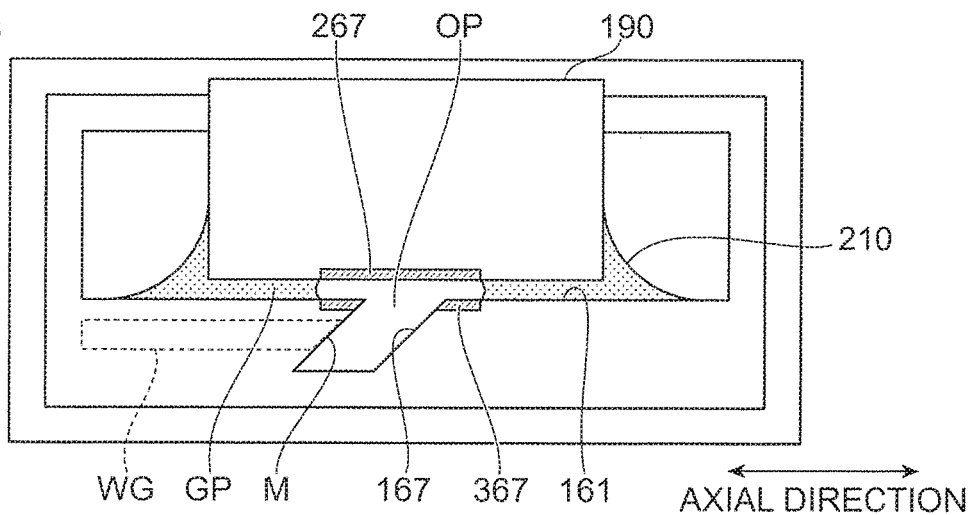
FIG. 20C depicts a simulation result of the flow of the adhesive in a direction parallel to the waveguide cores with the hydrophobic areas according to the second embodiment.

FIG. 20A depicts a configuration for simulation of fluid dynamics of the adhesive 210. FIG. 20B depicts a simulation result of the flow of the adhesive 210 in a direction parallel to the waveguide cores WG without the hydrophobic areas 267 and 367 according to a comparative example. FIG. 20C depicts a simulation result of the flow of the adhesive 210 in a direction parallel to the waveguide cores WG with the hydrophobic areas 267 and 367 according to the second embodiment.

An explanation is given about the simulation of fluid dynamics of the adhesive 210 around the hydrophobic areas 267 and 367. The simulation of fluid dynamics is conducted in a two dimensional flow.

As shown in FIG. 20A, the general configuration for the simulation includes the substrate side component 190 and the waveguide layer 161 provided with the mirror cavities 167. The substrate side component 190 and the waveguide layer 161 are provided in the atmosphere. In the initial state, the adhesive 210 in a fluidized state is enclosed in fields on both sides of the substrate side component 190, and then start to flow from the enclosed fields.

The properties of the adhesive 210 in a fluidized state are as follows: the density is $10^3$ kg/m$^3$; the viscosity is 0.1 Pa·s (the kinetic viscosity is $10^{-4}$ m$^2$/s); the surface tension is 0.03 N/m. As to the surface properties, the contact angle of a treated surface (the hydrophobic areas 267 and 367) is 80 degrees, and an untreated surface (the bottom surface of the waveguide layer 161 except the hydrophobic area 267, and the top surface of the waveguide layer 161 except the hydrophobic area 367) is 7 degrees. The first hydrophobic area edge PE1 is on a position separated by 10 um (micro meter) from the opening OP. The second hydrophobic area edge PE2 is on a position separated by 20 um (micro meter) from the opening OP.

As shown in FIG. 20B, the simulation results without the hydrophobic areas 267 and 367 indicate that the adhesive 210 may flow into the mirror cavities 167 (refer to an arrow A3). In other words, the adhesive 210 will eventually (for example, in more than 5 seconds) fall into the mirror cavities 167. On the other hand, as shown in FIG. 20C, the simulation results with the hydrophobic areas 267 and 367 indicate that the adhesive 210 does not flow into the mirror cavities 167. According to this simulation, providing the hydrophobic areas 267 and 367 can prevent the adhesive 210 from flowing into the mirror cavities 167.

Figure 21A:
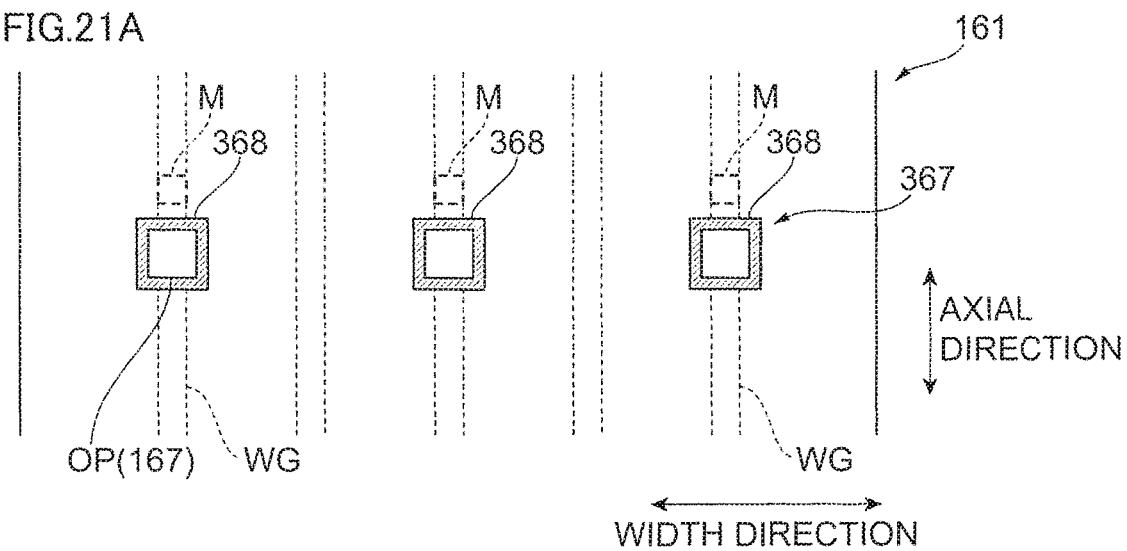
FIG. 21A depicts a top view of the waveguide layer according to the first modification of the second embodiment.
Figure 21B:
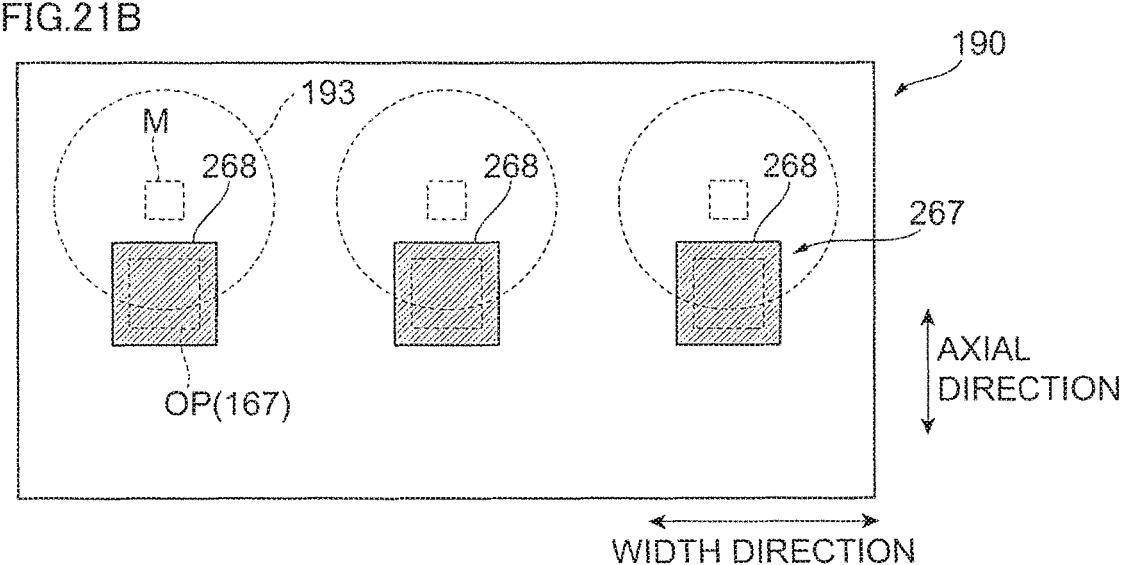
FIG. 21B depicts a bottom view of the substrate side component according to the first modification of the second embodiment.
Figure 21C:
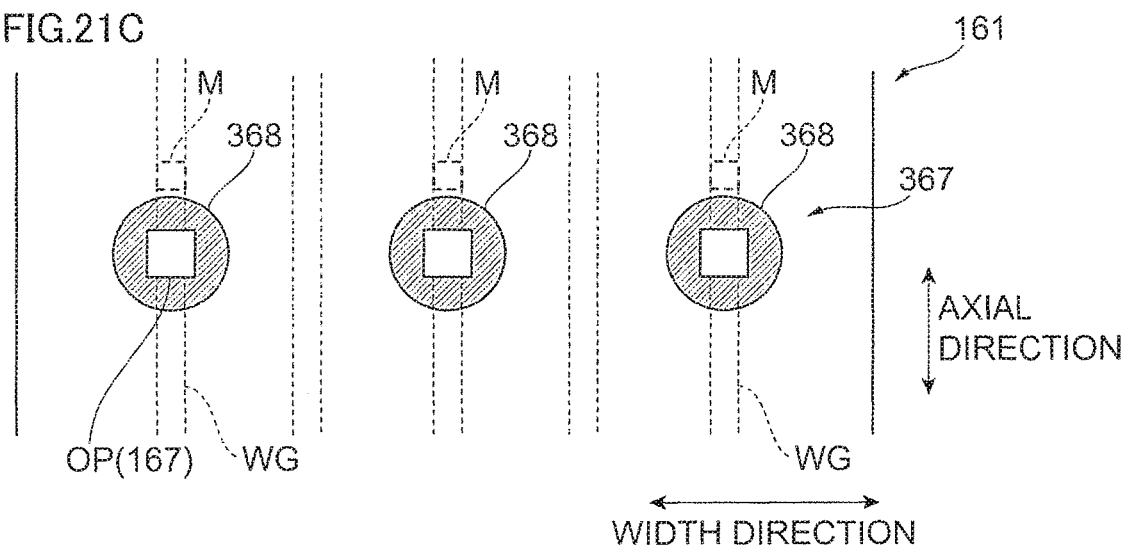
FIG. 21C depicts a bottom view of the substrate side component according to the second modification of the second embodiment.

FIG. 21A depicts a top view of the waveguide layer 161 according to the first modification of the second embodiment. FIG. 21B depicts a bottom view of the substrate side component 190 according to the first modification of the second embodiment. FIG. 21C depicts a bottom view of the substrate side component 190 according to the second modification of the second embodiment.

The hydrophobic areas 267 and 367 can be provided without the band areas 269 and 369. As shown in FIGS. 21A and 21B, the hydrophobic areas 267 and 367 can be provided with dispersed main areas 268 and 368, respectively.

The hydrophobic areas 267 and 367 can have any shape. As shown in FIG. 21C, the hydrophobic area 367 can be provided with main areas 368 having a round shape.

FIGS. 22A, 22B, 22C, 22D, and 22E depict a side view of the mirror cavities 167 according to the third, the forth, the fifth, the sixth and the seventh modification of the second embodiment, respectively.

Figure 22A:
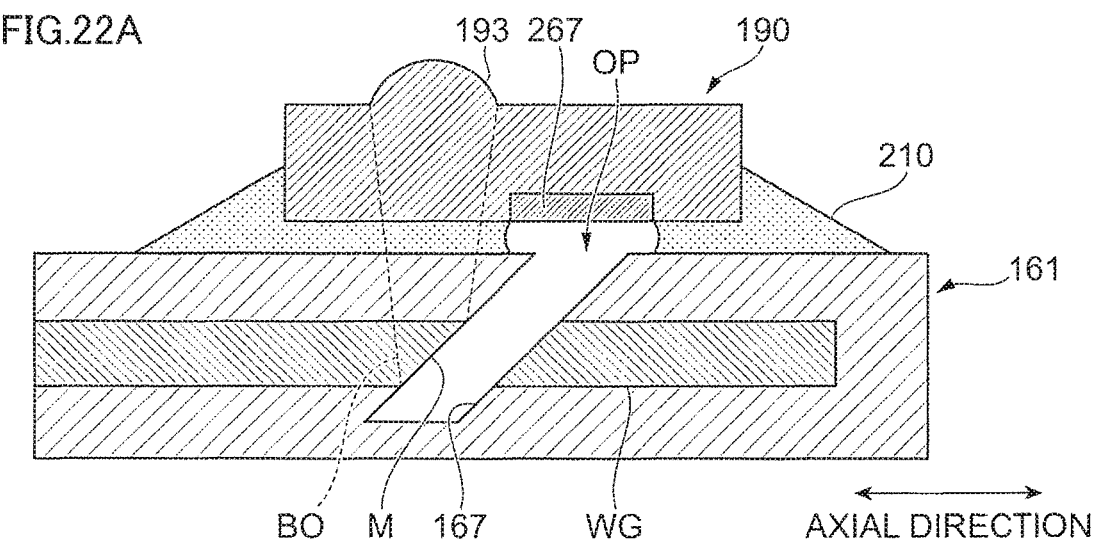

One of the hydrophobic areas 267 and 367 can be omitted as long as the other one of the hydrophobic areas 267 and 367 prevents the adhesive 210 from flowing into the mirror cavities 167. For example, as shown in FIG. 22A, the substrate side component 190 can include the hydrophobic area 267, but the waveguide layer 161 can be without the hydrophobic area 367.

Figure 22B:
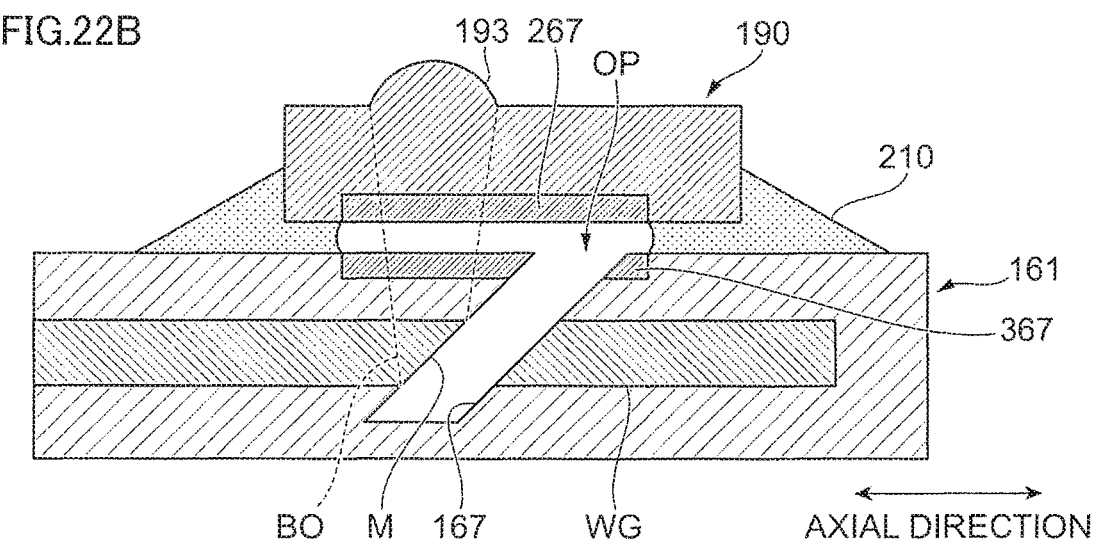

As shown in FIG. 22B, the hydrophobic areas 267 and 367 can be provided on the area enclosing both the opening OP of each mirror cavity 167 and the beam outline BO. Although the light beam traverses the air-material interfaces twice, causing reflection loss in this configuration, a part (most) of the volume of the gap GP is filled with the adhesive 210 providing better mechanical stability than side filling.

As shown in FIG. 22C, the hydrophobic areas 267 and 367 can surround the opening OP in a position separated from the beam outline BO. The distance from the second hydrophobic area edge PE2 to the opening OP is longer than the distance from the first hydrophobic area edge PE1 to the opening OP. The wide area of the hydrophobic areas 267 and 367 on the second hydrophobic area edge PE2 side can surely prevent the adhesive 210 from infiltrating into the opening OP from the second hydrophobic area edge PE2 side.

As shown in FIG. 22D, the hydrophobic areas 267 and 367 can be provided around the opening OP of each mirror cavity 167 and the beam outline BO. In other words, the hydrophobic areas 267 and 367 can be provided along edges of the substrate side component 190. This configuration may prevent the light from passing the hydrophobic areas 267 and 367.

The above mentioned configurations may also be applicable to any optical components (optoelectronic chip), such as a VCSEL chip, a PD chip, a lens array component. For example, as shown in FIG. 22E, the VCSEL chip 290 including an active area 293 can be directly mounted on the waveguide layer 161. The VCSEL chip 290 can be provided with the hydrophobic area 267 on the bottom surface of the VCSEL chip 290. The hydrophobic areas 267 and 367 may prevent the adhesive 210 from flowing into the mirror cavities 167.

Figure 23A:
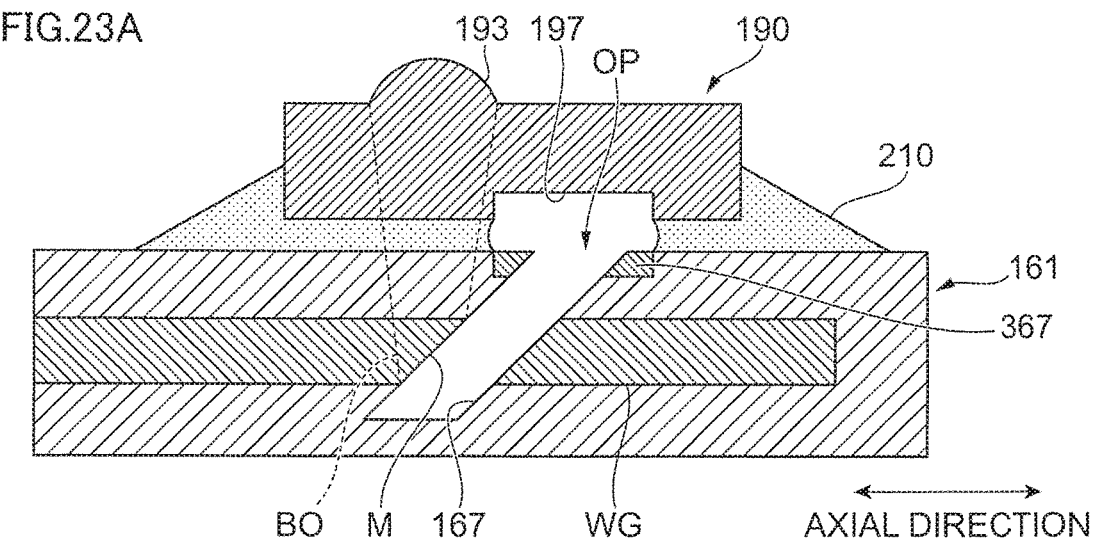
FIGS. 23A and 23B depict a side view of the mirror cavities according to the eighth and the ninth modification of the second embodiment
Figure 23B:
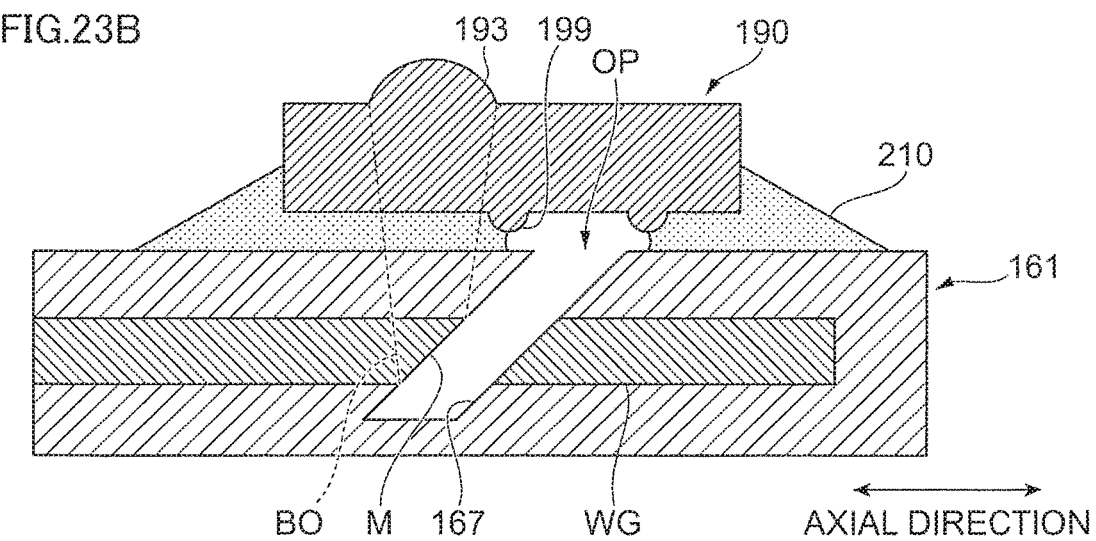

FIGS. 23A and 23B depict a side view of the mirror cavities 167 according to the eighth and the ninth modification of the second embodiment. As shown in FIG. 23A, a combination of the hydrophobic area 367 on the waveguide layer 161 and the grooves 197 on the substrate side component 190 can be provided to prevent the adhesive 210 from flowing into the mirror cavities 167. Further, as shown in FIG. 23B, protrusions 199 can be provided on the substrate side component 190 (or the waveguide layer 161) to prevent the adhesive 210 from flowing into the mirror cavities 167.

What is claimed is:

1. An optical structure, comprising:
   a substrate including a cavity;
   an optical component on the substrate that transmits light into the cavity; and
   an adhesive in a gap between the substrate and the optical component affixing the optical component to the substrate, wherein a predetermined portion having a surface treated to provide less wettability to a liquid adhesive than other areas surrounding the predetermined portion, the predetermined portion arranged around the cavity prevents the adhesive from infiltrating the cavity.

2. The optical structure of claim 1, wherein the predetermined portion is a hydrophobic surface.

3. The optical structure of claim 1, wherein the predetermined portion includes a fluoride hydrophobic coating.

4. The optical structure of claim 1, wherein both of a first surface of the substrate and a second surface of the optical component include the predetermined portion.

5. The optical structure of claim 1, wherein:
   the substrate includes a waveguide core and the cavity intersects the waveguide core, and
   an interface between the waveguide core and the cavity reflects a light passing through the waveguide core.

6. The optical structure of claim 5, wherein the cavity is filled with a gas, and the light is reflected at the interface by total internal reflection.

7. The optical structure of claim 5, wherein a plurality of waveguide cores are arranged substantially in parallel with each other,
   the optical component includes a plurality of lenses, and
   each of the plurality of lenses is aligned with a corresponding one of the plurality of waveguide cores.

8. The optical structure of claim 7, wherein the light traveling between one of the plurality of lenses and the corresponding one of the plurality of waveguide cores traverses the gap, and the adhesive fills a light path of the light included in the gap.

9. The optical structure of claim 7, wherein the predetermined portion is located apart from a light path of the light traveling between one of the plurality of lenses and the corresponding one of the plurality of waveguide cores.

10. The optical structure of claim 1, wherein the adhesive fills at least a part of the gap surrounding the predetermined portion.

11. The optical structure of claim 1, wherein the adhesive infiltrates into the gap due to capillary effect, and the predetermined portion prevents the adhesive from flowing into the cavity.

12. An optical multi-chip module, comprising:
   a substrate including a waveguide core and a cavity, the waveguide core allowing a light to pass therethrough, the cavity being located on a first surface of the substrate to intersect the waveguide core, the cavity being filled with a gas;
   an optical component on the substrate that transmits light into the cavity, the optical component including a second surface opposed to the first surface of the substrate; and
   an adhesive in a gap between the substrate and the optical component due to capillary effect affixing the optical component to the substrate, wherein the adhesive is faulted around the cavity in a predetermined portion of the gap, the predetermined portion including a surface treated to provide less wettability to a liquid adhesive than other areas surrounding the predetermined portion.

13. A method for fabricating an optical structure, the method comprising:
   forming a substrate with a cavity;
   forming an optical component;
   providing a predetermined portion on at least one of the substrate and the optical component, the predetermined portion including a surface treated to provide less wettability to a liquid adhesive than other areas surrounding the predetermined portion;
   applying an adhesive between the substrate and the optical component so that the adhesive infiltrates into a gap between the substrate and the optical component; and
   preventing the adhesive from flowing into the cavity with the predetermined portion such that light from the optical component is transmitted into the cavity.

* * * * *